United States Patent [19]
Furukawa

[11] Patent Number: 6,029,238
[45] Date of Patent: *Feb. 22, 2000

[54] CONTROL OF INFORMATION PROCESSING USING ONE OR MORE PERIPHERAL APPARATUS

[75] Inventor: Hideaki Furukawa, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/413,432

[22] Filed: Mar. 30, 1995

[30] Foreign Application Priority Data

Mar. 31, 1994 [JP] Japan ................................. 6-064049

[51] Int. Cl.$^7$ .................................................. G06F 13/00
[52] U.S. Cl. ................................. 712/1; 712/25; 712/32; 709/220; 709/226; 709/229; 358/1.15; 358/1.16
[58] Field of Search .............................. 395/800, 800.01, 395/681, 682; 364/DIG. 1; 712/1, 25, 32; 709/226, 229, 220; 358/1.15, 1.16

[56] References Cited

U.S. PATENT DOCUMENTS

| | | | |
|---|---|---|---|
| 4,803,623 | 2/1989 | Klashka et al. | 364/200 |
| 5,263,152 | 11/1993 | Smith et al. | 395/575 |
| 5,537,626 | 7/1996 | Kraslavsky et al. | 395/828 |
| 5,574,859 | 11/1996 | Yeh | 395/200.01 |
| 5,611,046 | 3/1997 | Russell et al. | 395/200.1 |
| 5,647,056 | 7/1997 | Barrett et al. | 395/200.01 |
| 5,828,864 | 10/1998 | Danknick et al. | 395/500 |

*Primary Examiner*—Daniel H. Pan
*Assistant Examiner*—Dzung Nguyen
*Attorney, Agent, or Firm*—Fitzpatrick, Cella, Harper & Scinto

[57] ABSTRACT

At least one peripheral processing apparatus and at least one information processing apparatus, interconnected through a network, include a storage means for storing control information by which the information processing apparatus controls the peripheral apparatus through the network. The control information stored in the storage means is transferred through the network to the information processing apparatus, which receives it, the control data being generated by the information processing apparatus based upon the control information transferred to the information processing apparatus control means executes control process according to the data control received.

86 Claims, 32 Drawing Sheets

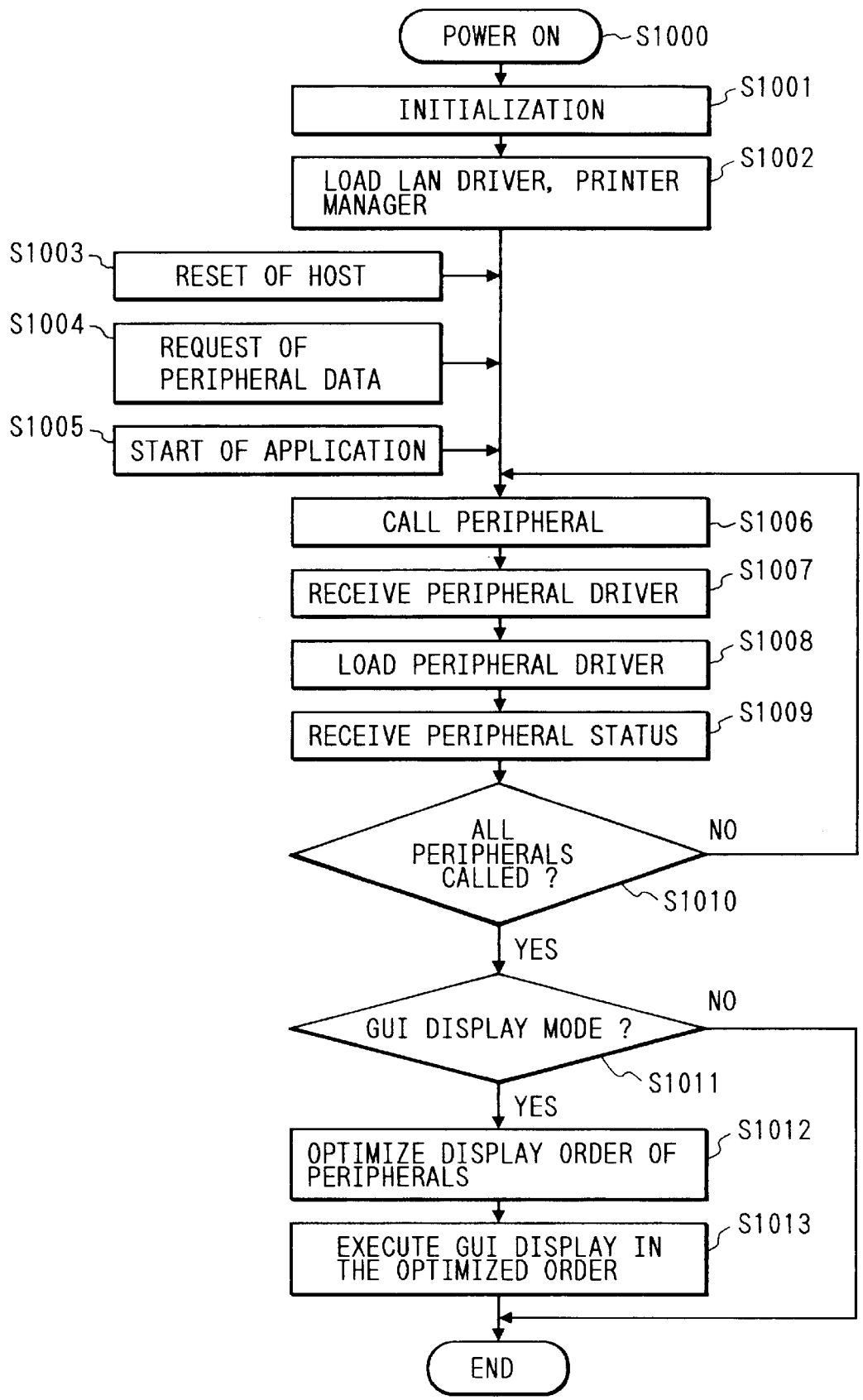

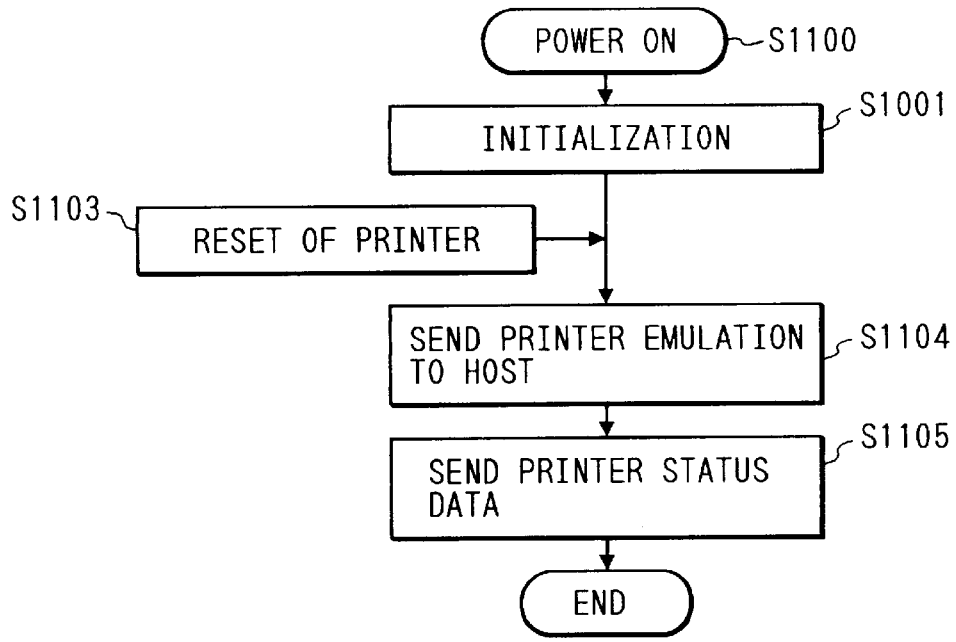
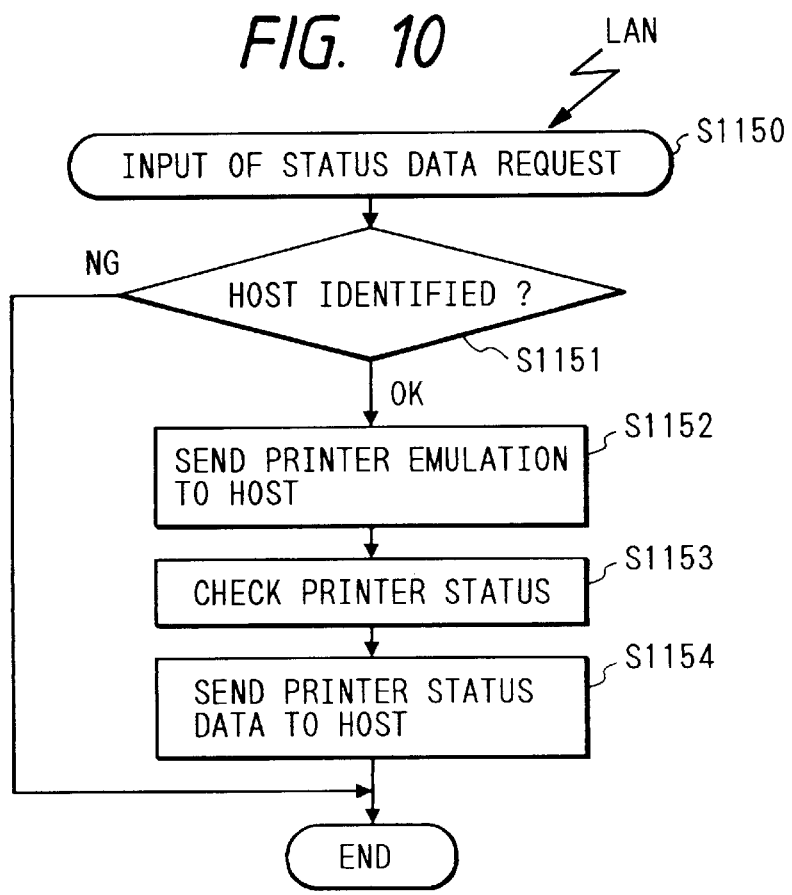

FIG. 17

| | | |
|---|---|---|
| — HOST 1 PRINTER MANAGER ▼ ▲ | | — 2000 |
| DISPLAY  OPTION  HELP | STANDBY OPERATION HALT·OFF | — 2005 |
| [HALT] [RESTART] [CANCEL] | _LOCATION<br>19U93X00Y<br>YOKO3. CANON. CO. JP<br>193. 19. 93. 00 | — 2006 |
| 1 : YOKO1  OPERATION<br>2 : YOKO3  OPERATION<br>3 : TOKI01  OPERATION<br>4 : TOKI02  OPERATION | ▲<br><br>▼ | — 2007 |
| [PRIORITY]  SPEED  LOCATION  COST | | — 2008 |
| DEVICE   CANON GP33FX + DF4 + STS2   40CPM | | — 2009 |
| OPTION | CONDITION | |
| ⦿ FAX<br>○ IMAGE READER<br>○ DF<br>○ SORTER<br>○ STAPLER | ○ A5   ○ B4<br>○ A4<br>○ A3<br>⦿ TONER | — 2010 |

FIG. 18

```
- │  YOKO1     PRINTER MANAGER           ▼ ▲  │ ─2001
─────────────────────────────────────────────
│ DISPLAY  OPTION  HELP │ STANDBY OPERATION HALT·OFF │─2805
─────────────────────────────────────────────
│                       │ LOCATION                   │
│  [HALT] [RESTART] [CANCEL] │ 19U93X01Y             │─2806
│                       │ YOKO3. CANON. CO. JP       │
│                       │ 193.19.93.01               │
─────────────────────────────────────────────
│ 1 : KAZU0 : XXX. JXW  LIPS3              ▲ │
│ 2 : KAZU2 : XXX. JXW  LIPS3                │
│ 3 : KAZU3 : XXX. JXW  LIPS3                │─2807
│ 5 : KAZU1 : XXX. JXW  LIPS3                │
│                                          ▼ │
─────────────────────────────────────────────
│ OPTION                │ CONDITION              │
│                       │  ○ A4                  │
│                       │  ○ B5                  │─2010
│                       │  ◉ TONER               │
─────────────────────────────────────────────
│ DEVICE │ CANON LBP4X4E LIPS3         10CPM  │─2009
```

FIG. 19

```
-    YOKO2    PRINTER MANAGER              ▼ ▲   — 2002

DISPLAY  OPTION  HELP          STANDBY OPERATION HALT·OFF

LOCATION
 [HALT]  [RESTART]  [CANCEL]   19U93X08Y
                               YOKO3. CANON. CO. JP
                               193. 19. 93. 08

1 : TAROO : XXX. JXW  LIPS3                     ▲
2 : TARO2 : XXX. JXW  LIPS3
3 : TARO3 : XXX. JXW  LIPS3
4 : TARO1  XXX  JXW   LIPS3
                                                ▼

OPTION                         CONDITION

○ A4
                                ○ A3

◉ TONER

DEVICE   CANON LBP3Y4E LIPS3            10CPM
```

| — | TOKIO1　　PRINTER MANAGER | ▼ ▲ |

| DISPLAY  OPTION  HELP | STANDBY OPERATION HALT·OFF |

[HALT] [RESTART] [CANCEL]

LOCATION

19U93X12Y
YOKO3. CANON. CO. JP
193. 19. 93. 12

▲

1 : * * * * : PPC MODE        ( * *.min)
2 : HANA2 : XXX. JXW LIPS3 (7.min)
3 : HANA2 : XXX. JXW LIPS3 (13.min)
4 : HANA1 : XXX. JXW LIPS3 (2.min)

▼

| OPTION | CONDITION |
|---|---|
| ○ IMAGE READER<br>○ DF<br>○ SORTER<br>○ STAPLER | ○ A5　○ B4<br>○ A4<br>○ A3<br><br>◉ TONER |

| DEVICE | CANON GP33 +DF4 +STS2　　　40CPM |

FIG. 21

```
                                                              2004
┌─────────────────────────────────────────────────────────────┐
│ −    TOKIO2       PRINTER MANAGER              ▼  ▲        │
├──────────────────────────────────┬──────────────────────────┤
│ DISPLAY  OPTION  HELP            │ STANDBY OPERATION HALT·OFF│
├──────────────────────────────────┼──────────────────────────┤
│                                  │ LOCATION                 │
│  ┌─────┐ ┌───────┐ ┌──────┐      │ 19U93X12Y                │
│  │HALT │ │RESTART│ │CANCEL│      │ YOKO3. CANON. CO. JP     │
│  └─────┘ └───────┘ └──────┘      │ 193. 19. 93. 12          │
├──────────────────────────────────┴──────────────────┬───────┤
│                                                     │   ▲   │
│  1: ****  FAX MODE     (** min)                     │       │
│  2: POTI2 : XXX.  JXW  LIPS3  (7. min)              │       │
│  3: POTI2 : XXX.  JXW  LIPS3  (13. min)             │       │
│  4: POTI1 : XXX.  JXW  LIPS3  (2. min)              │       │
│                                                     │   ▼   │
├─────────────────────────────────────┬───────────────┴───────┤
│ OPTION                              │ CONDITION             │
├─────────────────────────────────────┼───────────────────────┤
│  ○ FAX                              │  ○ A5    ○ B4         │
│  ○ IMAGE READER                     │  ○ A4                 │
│  ○ DF                               │  ○ A3                 │
│  ○ SORTER                           │                       │
│  ○ STAPLER                          │  ◉ TONER              │
├────────┬────────────────────────────┴──────────────┬────────┤
│ DEVICE │ CANON GP33FX + DF4 + STS2                 │ 40 CPM │
└────────┴───────────────────────────────────────────┴────────┘
```

FIG. 22

| | | |
|---|---|---|
| IP | XXXXXX | LAN |
| MAC | XXXXXX | |
| LOCATION | XXXXXX | |
| USER | XXXXXX | |
| DEALER | XXXXXX | |
| DEVICE | 466/L V005 | |
| MAKER | DELL | HARD |
| CPU | 1486DX | |
| CLOCK | 66MHz | |
| CACHE MEM | 128KB | |
| MAIN MEM | 230MB | |
| VACANT MEM | 100MB | |
| CPU OCCUPATION | 1% | |
| WAITING TIME | 0MSEC | |
| LAN | ETHERNET DRIVER | LAN |
| OS | DOS5.0/V | OS |
| WIN | WINDOWS3.1 | |
| LAN OS | NET-WARE | |
| APC 1/2 | EXCEL | APC |
| APC 2/2 | WORD | |
| PM | PRINTER MANAGER V3 | |

FIG. 23

| | | |
|---|---|---|
| IP | XXXXXX | LAN |
| MAC | XXXXXX | |
| LOCATION | XXXXXX | |
| USER | XXXXXX | |
| DEALER | XXXXXX | |
| PRINTER STATUS | PRINTING | |
| SPEED | 5CPM A4 | SPEED |
| SIDE | SINGLE SIDE COPY | |
| PRINT RESOLUTION | 400DPI | RESOLUTION |
| RUNNING COST | ¥3/SHEET | COST |
| SHEET 1/3 | A4 FULL | SHEET |
| SHEET 2/3 | B5 HALF | |
| SHEET 3/3 | B4 EMPTY | |
| TONER | BK HALF | TONER |
| DEVICE | LBP-4XX4 V002 | HARD |
| MAKER | KANON | |
| CPU | 1386DX | |
| CLOCK | 33MHz | |
| CACHE MEM | 1024KB | |
| INPUT MEM | 1024KB | |
| MAIN MEM | 100MB | |
| VACANT MEM | 20MB | |
| CPU OCCUPATION | 2% | |
| WAITING TIME | 30MSEC | |

FIG. 24

| LAN | ETHERNET DRIVER | LAN |
|---|---|---|
| OS | DOS5. 0/V | OS |
| WIN | WINDOWS3. 1 | |
| LAN OS | NET-WARE | |
| PM | PRINTER MANAGER V3 | APC |
| PDL 1/3 | PC-PR201H EMULATION | DV |
| PDL 2/3 | ESC/P 24-J84 | DV |
| PDL 3/3 | LIPS III | DV |
| FONT 1/4 | OUTLINE MING | DV |
| FONT 2/4 | BIT MAP GOTHIC | DV |
| FONT 3/4 | BIT MAP MING | DV |
| FONT 4/4 | BIT MAP COURIER | DV |
| OPTION | * | |

FIG. 25

| | | |
|---|---|---|
| IP | XXXXXX | LAN |
| MAC | XXXXXX | |
| LOCATION | XXXXXX | |
| USER | XXXXXX | |
| DEALER | XXXXXX | |
| COPIER STATUS | FAX | |
| SPEED | 30CPM A4 | SPEED |
| SIDE | BOTH SIDE COPY | |
| PRINT RESOLUTION | 600DPI | RESOLUTION |
| RUNNING COST | ¥2/SHEET | COST |
| SHEET 1/3 | A4 FULL | SHEET |
| SHEET 2/3 | B5 HALF | |
| SHEET 3/3 | B4 EMPTY | |
| TONER | BK HALF | TONER |
| NEEDLE | HALF | NEEDLE |
| READ RESOLUTION | 600DPI | READER |
| DEVICE | GP65V001 | HARD |
| MAKER | KANON | |
| CPU | 1386DX | |
| CLOCK | 33MHz | |
| CACHE MEM | 1024KB | |
| INPUT MEM | 1024KB | |
| MAIN MEM | 200MB | |
| VACANT MEM | 100MB | |
| CPU OCCUPATION | 5% | |
| WAITING TIME | 400MSEC | |

FIG. 26

| LAN | ETHERNET DRIVER | DV |
|---|---|---|
| OS | DOS5. O/V | OS |
| WIN | WINDOWS | |
| LAN OS | NET-WARE | |
| PM | PRINTER MANAGER V03 | APC |
| RM | READER MANAGER V05 | |
| FONT 1/5 | OUTLINE MING | DV |
| FONT 2/5 | BIT MAP MING | DV |
| FONT 3/5 | BIT MAP GOTHIC | DV |
| FONT 4/5 | BIT MAP BRUSH | DV |
| FONT 5/5 | BIT MAP COURIER | DV |
| PDL 1/4 | PC-PR201 EMULATION V1 | DV |
| PDL 2/4 | ESC/P 24-J84 | DV |
| PDL 3/4 | LIPS III | DV |
| PDL 4/4 | LIPS II + | DV |
| OPTION 1/3 | FAX G3 | |
| OPTION 2/3 | DF | |
| OPTION 3/3 | 20 PIN SORTER + STAPLER | |
| OPTION NOW USED | DF + SORTER | |

FIG. 30

| | | | |
|---|---|---|---|
| UPDATE | 92/7/11/15:31 | | 5000 |
| IP | XXXXXX | LAN | |
| MAC | XXXXXX | | |
| LOCATION | XXXXXX | | |
| USER | XXXXXX | | |
| DEALER | XXXXXX | | |
| COPIER STATUS | FAX | | |
| SPEED | 30CPM A4 | SPEED | |
| SIDE | BOTH SIDE COPY | | |
| PRINT RESOLUTION | 600DPI | RESOLUTION | |
| RUNNING COST | ¥2/SHEET | COST | |
| SHEET 1/3 | A4 FULL | SHEET | |
| SHEET 2/3 | B5 HALF | | |
| SHEET 3/3 | B4 EMPTY | | |
| TONER | BK HALF | TONER | |
| NCOP | 9123450 | | 5001 |
| TRB-CNT | 2 | | 5002 |
| TRB-10000 | 15 | | 5003 |
| TRB-TTL | 975 | | 5004 |
| NEEDLE | HALF | NEEDLE | |
| READ RESOLUTION | 600DPI | READER | |
| DEVICE | GF65V001 | HARD | |
| CONSUMPTIVE POWER | AC100V 1500W | | 5005 |
| MAKER | KANON | | |
| CPU | 1386DX | | |
| CLOCK | 33MHz | | |
| CACHE MEM | 1024KB | | |

FIG. 31

| INPUT MEM | 1024KB | |
|---|---|---|
| MAIN MEM | 200MB | |
| VACANT MEM | 100MB | |
| CPU OCCUPATION | 5% | |
| WAITING TIME | 400MSEC | |

| LAN | ETHERNET DRIVER | DV |
|---|---|---|
| OS | DOS5. O/V | OS |
| WIN | WINDOWS | |
| LAN OS | NET-WARE | |
| PM | PRINTER MANAGER V03 | APC |
| RM | READER MANAGER V05 | |
| FONT 1/5 | OUTLINE MING | DV |
| FONT 2/5 | BIT MAP MING | DV |
| FONT 3/5 | BIT MAP GOTHIC | DV |
| FONT 4/5 | BIT MAP BRUSH | DV |
| FONT 5/5 | BIT MAP COURIER | DV |
| PDL 1/4 | PC-PR201 EMULATION V1 | DV |
| PDL 2/4 | ESC/P 24-J84 | DV |
| PDL 3/4 | LIPS III | DV |
| PDL 4/4 | LIPS II + | DV |
| OPTION 1/3 | FAX G3 | |
| OPTION 2/3 | DF | |
| OPTION 3/3 | 20 PIN SORTER + STAPLER | |
| OPTION NOW USED | DF + SORTER | |

FIG. 32

| | | | |
|---|---|---|---|
| UPDATE | 92/7/11/15:31 | | 6000 |
| IP | XXXXX | LAN | |
| MAC | XXXXX | | |
| LOCATION | XXXXX | | |
| USER | XXXXX | | |
| DEALER | XXXXX | | |
| PRINTER STATUS | PRINTING | | |
| SPEED | 5CPM A4 | SPEED | |
| SIDE | SINGLE SIDE COPY | | |
| PRINT RESOLUTION | 400DPI | RESOLUTION | |
| RUNNING COST | ¥3/SHEET | COST | |
| SHEET 1/3 | A4 FULL | SHEET | |
| SHEET 2/3 | B5 HALF | | |
| SHEET 3/3 | B4 EMPTY | | |
| TONER | BK HALF | TONER | |
| NCOP | 103450 | | 6001 |
| TRB-CNT | 1 | | 6002 |
| TRB-10000 | 10 | | 6003 |
| TRB-TTL | 105 | | 6004 |
| DEVICE | LBP-4XX4 V002 | HARD | |
| CONSUMPTIVE POWER | AC100V 700W | | 6005 |
| MAKER | KANON | | |
| CPU | 1386DX | | |
| CLOCK | 33MHz | | |
| CACHE MEM | 1024KB | | |

FIG. 33

| INPUT MEM | 1024KB | |
|---|---|---|
| MAIN MEM | 100MB | |
| VACANT MEM | 20MB | |
| CPU OCCUPATION | 2% | |
| WAITING TIME | 30MSEC | |

| LAN | ETHERNET DRIVER | LAN |
|---|---|---|
| OS | DOS5. 0/V | OS |
| WIN | WINDOWS3. 1 | |
| LAN OS | NET-WARE | |
| PM | PRINTER MANAGER V3 | APC |
| PDL 1/3 | PC-PR201H EMULATION | DV |
| PDL 2/3 | ESC/P 24-J84 | DV |
| PDL 3/3 | LIPS III | DV |
| FONT 1/4 | OUTLINE MING | DV |
| FONT 2/4 | BIT MAP GOTHIC | DV |
| FONT 3/4 | BIT MAP MING | DV |
| FONT 4/4 | BIT MAP COURIER | DV |
| OPTION | * | |

CONTROL OF INFORMATION PROCESSING USING ONE OR MORE PERIPHERAL APPARATUS

BACKGROUND OF THE INVENTION

1. Field of the Invention

The present invention relates to a host computer and a peripheral apparatus used in an information processing system, in which at least one host computer is connected with a plurality of peripheral apparatuses through a network. More particularly, it relates to a host computer which performs an optimum drive control in accordance with a status of each peripheral apparatus.

2. Related Background Art

Up to this time, an information processing system, in which a host computer is connected with peripherals, such as printers and the like, has previously incorporated peripheral driver soft-ware into the computer side for driving the peripherals using the driver software.

In such an information processing system, however, the computer is required to prepare respective driver software unique to the respective peripherals to be connected, therefore, particularly when adding a new peripheral device to the network, the corresponding driver software must be newly implemented on the host computer for running the new peripheral device. The setting operation is very complicated, and this has caused a problem in that most common users cannot utilize such a driver software but must employ a specialist. There has been also another problem in that the full performance of the device may not be drawn forth depending upon how skillfully the new software is prepared and installed.

In addition, still another problem has arisen in that, after executing initialization of the driver software for driving the corresponding peripheral, even if the power supply of the peripheral has been shut off, or the peripheral has been unable to be used due to printer toner or ink running out, the corresponding driver software will attempt to make the peripheral run without knowing of its unavailability, and waste time.

For this reason, e.g., in the case of a printer, print data can be wastefully stored in a valuable storage device one after another without execution of printing.

Also, in the case that a plurality of printing devices have been connected by a network, a printer from which prints shall be outputted is selected by designating the printing device name or its registered name on the host computer, so that the following inconvenience can occur.

Far too few users know performance of the printer well enough to set all kinds of parameters for printer drive software to optimum values.

Since the designation of printer is decided by the initialization of the host computer or the printer drive software, irrespective of user's purpose or starting state of the printer, the print outputs are centered at the designated printer in spite of a plurality of usable printers being connected, and this causes low printing efficiency.

As mentioned above, since network resources can not be put to practical use effectively, there has arisen still another problem in that the system efficiency of the network system is lowered.

SUMMARY OF THE INVENTION

In consideration of such conventional problems, an object of the present invention is to provide information processing method and apparatus capable of using any peripheral connected to the network, and an information processing system therefor.

In order to achieve the above-mentioned object, there are provided peripheral apparatuses and at least one information processing apparatus, both being interconnected through a network according to the present invention, and control methods in the peripheral apparatuses and in the information processing apparatus, including a storage means for storing control information by which the information processing apparatus controls the peripheral apparatuses through the network; a transfer means for transferring the control information stored in the storage means through the network to the information processing apparatus; a receiving means for receiving control data through the network, the control data being generated by the information processing apparatus based upon the control information transferred to the information processing apparatus by the transfer means; and a control means for executing control process according to the control data received in the receiving means.

In another aspect of the present invention, there are included a control information storage means for storing peripheral apparatus controlling information by which the information processing apparatus controls the peripheral processing apparatuses through the network; a unique information storage means for storing information unique to each peripheral processing apparatus; a transfer means for transferring both the peripheral apparatus controlling information stored in the control information storage means and the unique information stored in the unique information storage means through the network to the information processing apparatus; a receiving means for receiving control data through the network, the control data being generated by the information processing apparatus based upon both the control information and the unique information transferred to the information processing apparatus by the transfer means; and a control means for executing control process according to the control data received in the receiving means.

In still another aspect of the present invention, there are included a control information receiving means which receives control information for controlling the peripheral processing apparatuses from the peripheral processing apparatus through the network; a storage means for storing the control information received in the control information receiving means; and a generation and transfer means for generating control data of the peripheral processing apparatuses based upon the control information stored in the storage means and transferring the control data through the network to the peripheral processing apparatuses.

In still another aspect of the present invention, there are included a control information receiving means which receives both control information for controlling the peripheral processing apparatuses and information unique to each peripheral processing apparatus from the peripheral processing apparatus through the network; a storage means for storing both the control information and the unique information received in the control information receiving means; a selection means for selecting a peripheral apparatus based upon the unique information; and a generation and transfer means for generating control data of the peripheral apparatuses based upon the control information stored in the storage means and transfer the control data through the network to the above peripheral apparatus selected in the selection means.

In still another aspect of the present invention, there are included a storing process for storage of control information by which the information processing apparatus controls the peripheral processing apparatuses through the network; a transferring process in which the control information stored in the storing process is transferred through the network to the information processing apparatus; a receiving process in which control data is received through the network, the control data being generated based upon the control information transferred to the information processing apparatus in the transferring process; and a controlling process for execution of control according to the control data received in the receiving process.

In still another aspect of the present invention, there are included a control information storing process for storage of peripheral apparatus controlling information by which the information processing apparatus controls the peripheral processing apparatuses through the network; a unique information storing process for storage of information unique to each peripheral processing apparatus; a transferring process in which both the peripheral apparatus controlling information stored in the control information storing process and the unique information stored in the unique information storing process are transferred through the network to the information processing apparatus; a receiving process in which control data is received through the network, the control data being generated by the information processing apparatus based upon both the control information and the unique information transferred to the information processing apparatus in the transferring process; and a controlling process for execution of control according to the control data received in the receiving process.

In still another aspect of the present invention, there are included a control information receiving process in which control information for controlling the peripheral processing apparatuses are received from the peripheral processing apparatuses through the network; a storing process for storage of the control information received in the control information receiving process; a generating and transferring process in which control data of the peripheral processing apparatuses is generated based upon the control information stored in the storing process and transferred through the network to the peripheral processing apparatuses.

In still another aspect of the present invention, there are included a receiving process in which both informations are received through the network, one control information for controlling the peripheral processing apparatuses and the other unique information to each peripheral processing apparatus; a storing process for storage of both the control information and the unique information received in the control information receiving process: a selecting process for selecting a peripheral apparatus based upon the unique information; a generating and transferring process in which control data of the peripheral processing apparatuses is generated based upon the control information stored in the storing process and transferred through the network to the above peripheral apparatus selected in the selecting process.

BRIEF DESCRIPTION OF THE DRAWINGS

FIG. 8 is a flow chart showing a process of inputting and setting status concerning a peripheral in the host computer;

FIG. 9 is a flow chart showing an initialization process in the printer;

FIG. 10 is a flow chart showing a response of the printer to the host computer;

FIG. 17 is a diagram showing information concerning the peripherals displayed on the CRT of the host computer;

FIG. 19 is a diagram showing information concerning a printer PT1 displayed on the CRT of host computer;

FIG. 18 is a diagram showing information concerning a printer PT2 displayed on the CRT of host computer;

FIG. 20 is a diagram showing information concerning a copier 15 displayed on the CRT of the host computer;

FIG. 21 is a diagram showing information concerning a copier 16 displayed on the CRT of the host computer;

FIG. 22 is a diagram showing a device status of the host computer;

FIGS. 23 and 24 are diagrams showing a device status of the printer;

FIGS. 25 and 26 are diagrams showing a device status of the digital copier;

FIGS. 30 to 33 are diagrams showing a structure of a device status table in the copier according to the third embodiment.

DETAILED DESCRIPTION OF THE PREFERRED EMBODIMENTS

Preferred embodiments according to the present invention will be described below.

First Embodiment

System Structure

Figure 1:
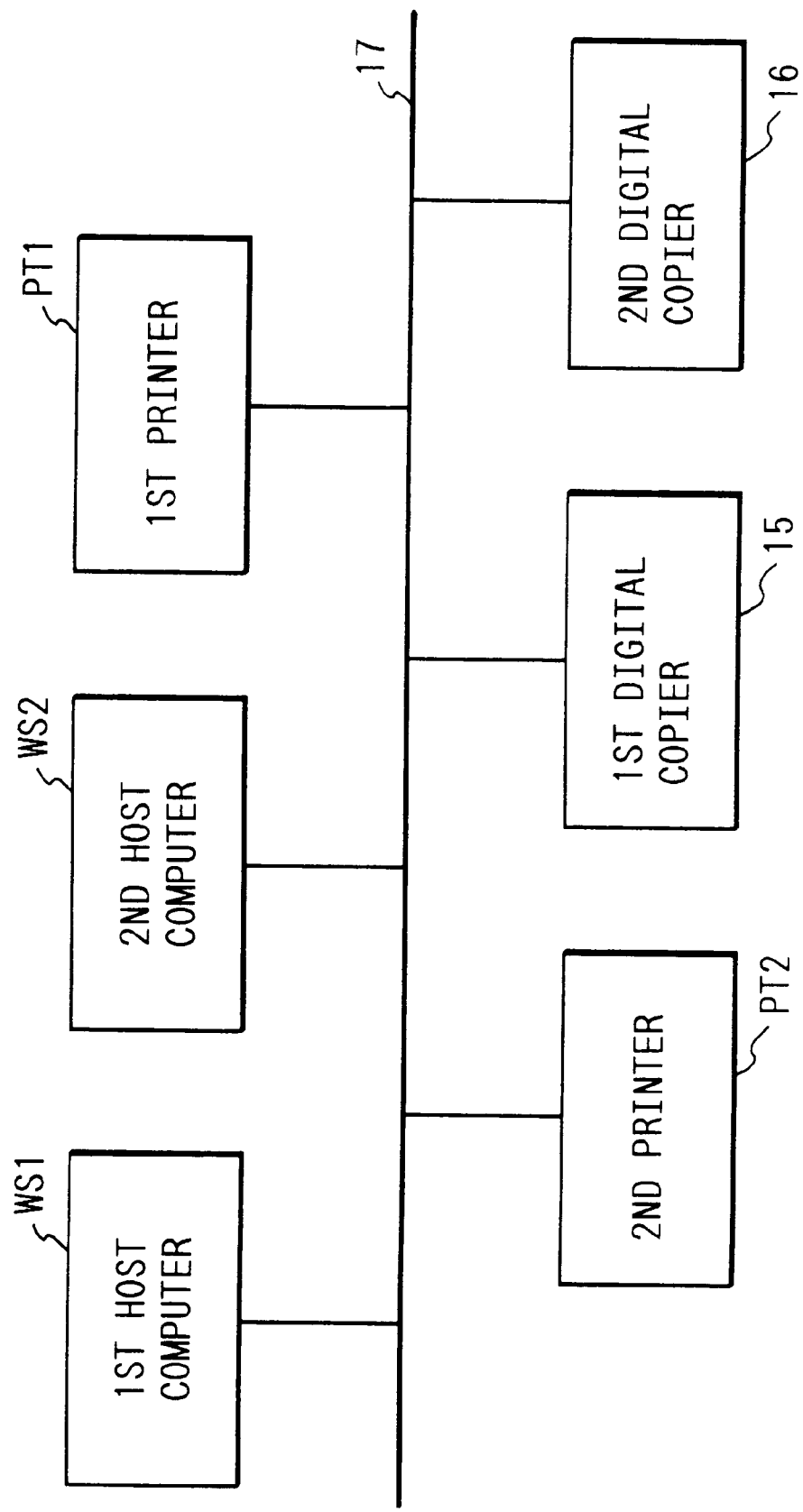
FIG. 1 is a diagram showing an overall system structure including host computers and various peripherals respectively connected to a network.

FIG. 1 shows an example of an information processing system structure according to a first embodiment of the present invention. In this structure, a first host computer WS1 and a second host computer WS2 are connected through a local area network 17 respectively with a first printer PT1, a second printer PT2, a first digital copier 15 and a second digital copier 16. Hereinbelow, the local area network 17 will where convenient be merely called the "network".

As an aside, though the host computer, the printer and the copier are connected two by two on the network in FIG. 1, the present invention is not limited to any particular number of devices.

The local area network 17 can use, as a physical specification and an access procedure specification, a token bus method defined at IEEE 802. 4. It can also use a "star network" forming a star-shaped network in physical topology as defined at IEEE802. 3 1BASE 5, a token ring method defined at IEEE802. 3 1BASE 5 or the like.

A network operating system making the local area network 17 run can adopt "Netware V3.1 (manufactured by Novel Co. ltd.)" used with an MS-DOS operating system or with Macintosh computers, "Network Manager V2.1" for DOS/V machines, or the like.

Hardware Structure of Host Computer

Figure 2:
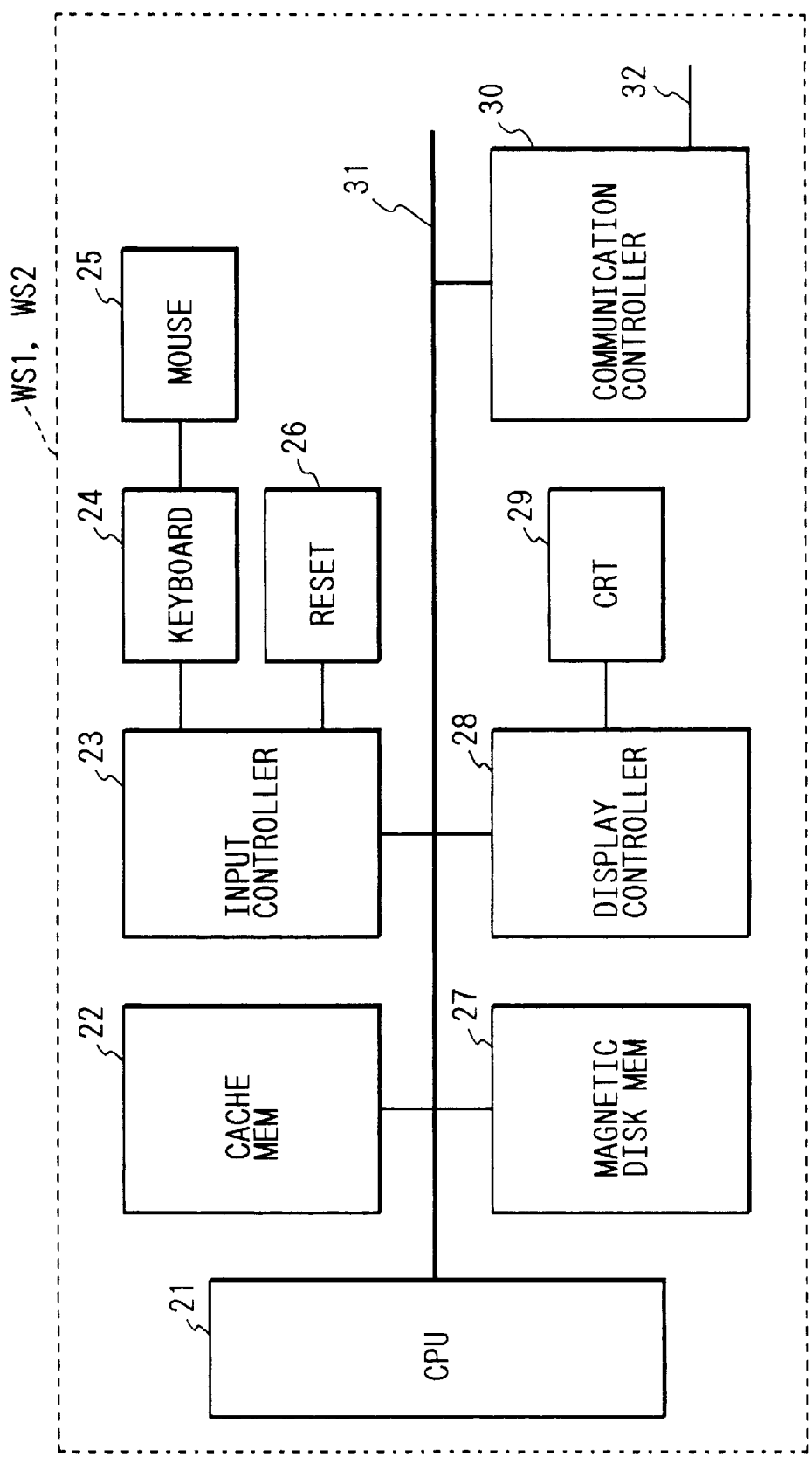
FIG. 2 is a diagram showing a structure of a host computer.

FIG. 2 shows a structure adopted in both the first host computer WS1 and the second host computer WS2.

The structure includes a CPU 21 for controlling all of the processings in the host computer, a cache memory 22 as a rapid access memory storing data or application software programs, a magnetic disk memory 27 as a mass memory used mainly for application software programs, a keyboard 24 and a mouse 25 used for inputting data and commands intending to edit texts or unwind programs, a CRT 29 for display, a communication controller 30 for connecting the host computer to the local area network 17, etc.

The CPU 21 is connected with the above devices, such as the memories and the CRT, directly from a data bus 31, or through controllers. An input controller 23 transmits signals input from the mouse 25 for selecting one of one or more icons shown on the screen, the keyboard 24 for inputting the data and the commands, or a reset controller 26. The reset controller 26 then generates signals at the time of supplying the main power or pushing a reset button provided on the host computer body for initializing the CPU 21 or application softwares, and the signals are transmitted to the input controller 23.

For the reset button, one of keyboard switches can be used, for example, the stop key or the main reset button of the host computer.

Next, the display controller 28 changes display data into pixel data so as to display the display data on the CRT 29 from the CPU 21, resulting in creation of image data signals. The communication controller 30 sends and receives data from and to each device through an interface under control of the network operating system mentioned above.

Though the first and second host computers WS1 and WS2 have the same structure, if their addresses are different from each other on the network, both of them can be operated at the same time.

Hardware Structure of Printer

Figure 3:
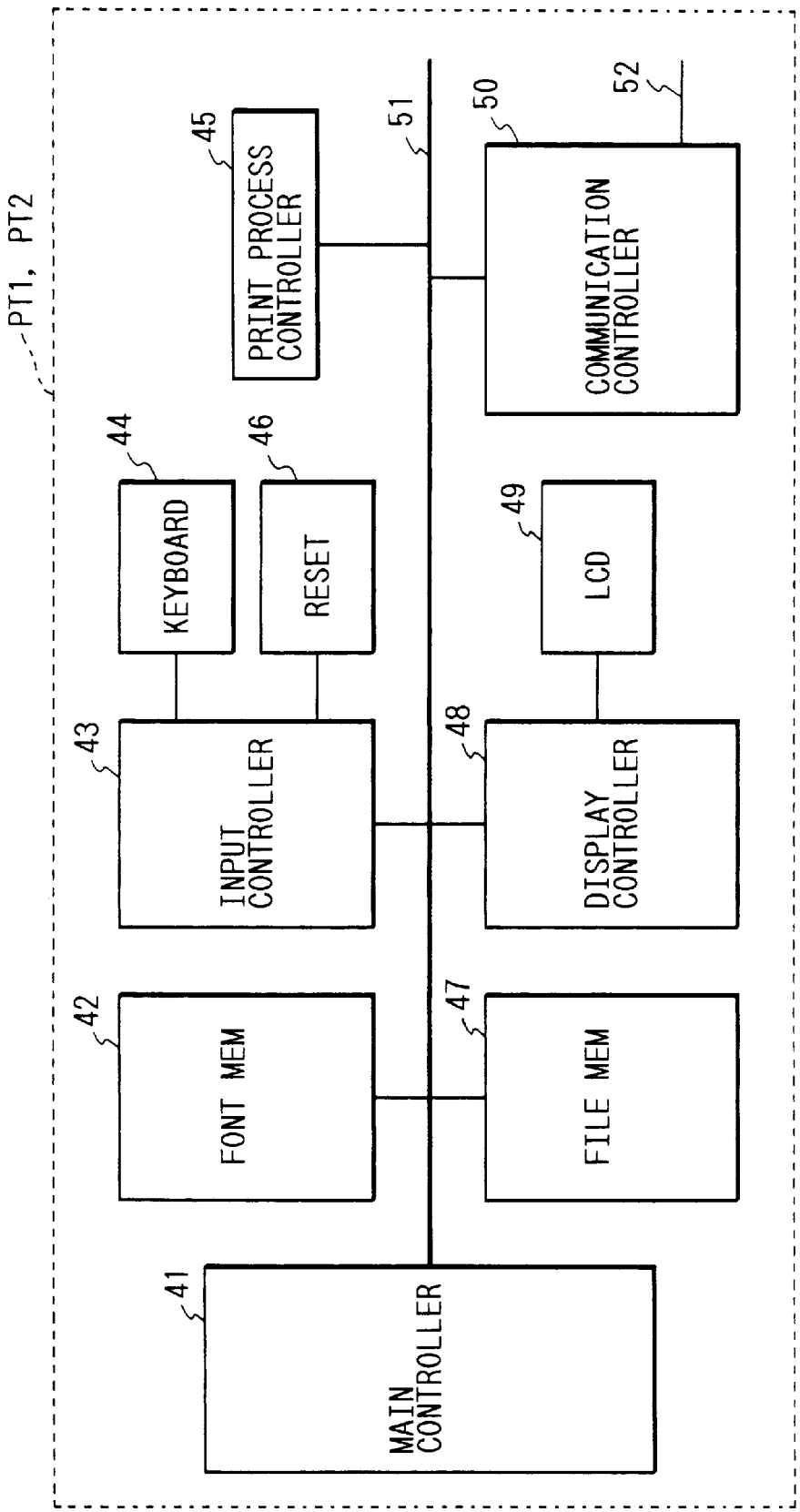
FIG. 3 is a diagram showing a structure of a printer.

FIG. 3 shows a structure adopted in both the first and second printers PT1 and PT2.

The structure includes a printing process controller 45 for controlling an electrostatic copying process using laser light, a communication controller 50 for communication with the network for receiving data to be printed, a file memory 47 for temporarily storing the data received from the network, a font memory 42 for unwinding the data stored in the file memory 47 so that the data can be printed, a main controller 41 for controlling all of the above units at the same time, etc. The respective units are integrated with each other by a common internal data bus 51.

The main controller 41 is constituted of a CPU, a program memory, a data memory, etc. The print data delivered from the host computer is received in a network interface 52 and the communication controller 50, executing data processing, such as to unwind the print data according to a page description language (PDL) or the like. The printer is thus controlled so that the printing is done on a paper through the process control for printing.

An input controller 43 is connected to a keyboard 44 and a mouse (not shown) for inputting data and commands intending to execute printing, file retrieval, text editing, and initialization of the printer interface, and a reset controller 46 which generates signals at the time of supplying the main power to the printer, or pushing a reset button for initializing the main controller 41 or an application software. Further details will be described later.

For the reset controller 46, a keyboard switch can be used, for example, the reset key or the main reset button of the printer.

A display controller 48 is connected to a liquid crystal display (LCD) 49 to display the printer status as well as the data or command inputs.

Though the first and second printers PT1 and PT2 have the same structure, if addresses of them are different from each other on the network, both of them can be operated at the same time.

Hardware Structure of Digital Copier

Figure 4:
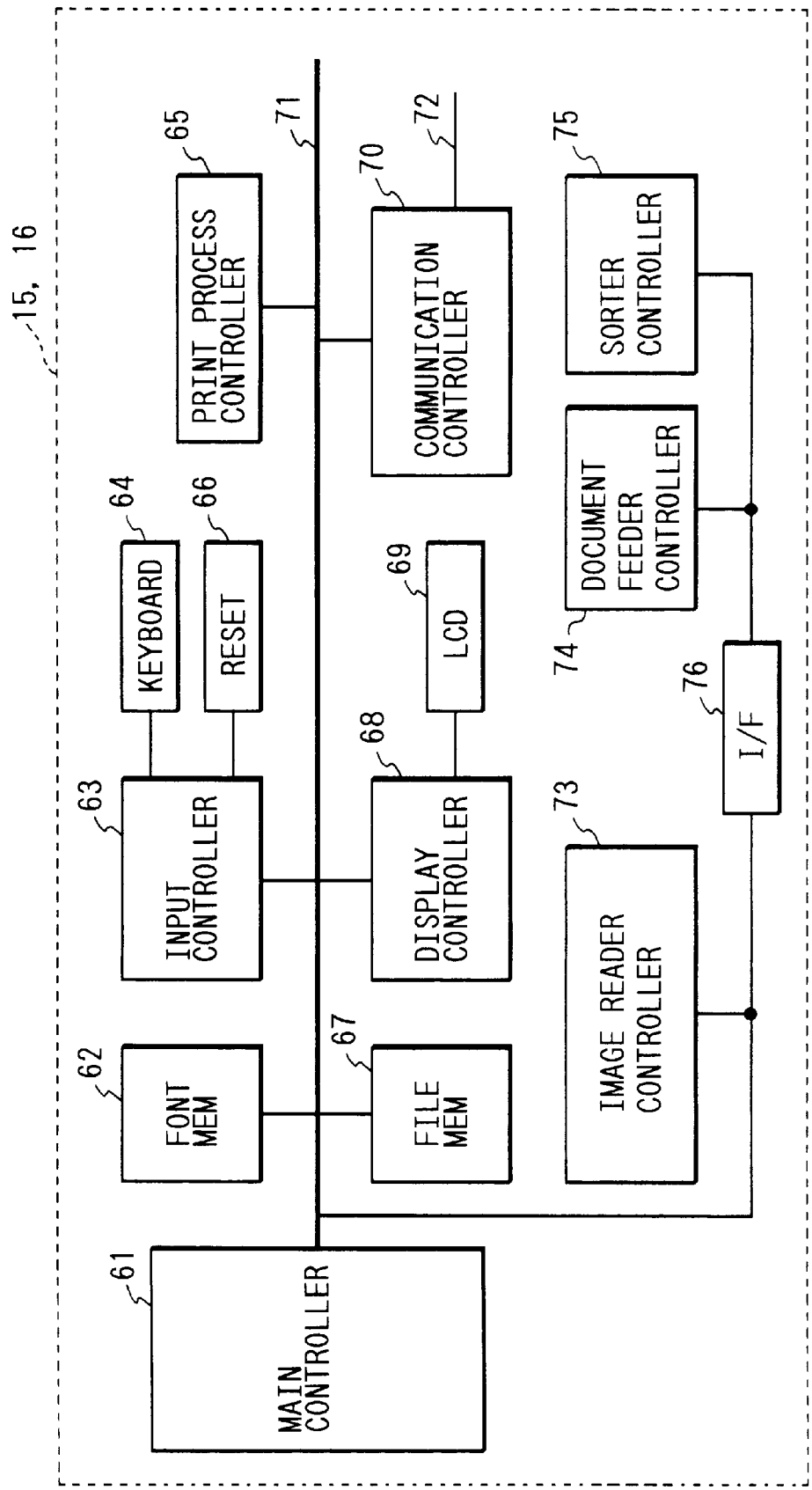
FIG. 4 is a diagram showing a structure of a digital copier.

FIG. 4 shows a structure adopted in both the first and second copiers 15 and 16. The digital copier 15 has functions as a printer besides a copying machine.

When used as a copying machine, document sheets are set on an automatic document feeder (not shown) installed on a document table of the copy machine, and copying operation is started with pushing a print button on a keyboard 64 according to a copying process set in advance.

A document feeder controller 74 controls the document sheets to be fed to an image reader (image reading part). An image reader controller 73 contemporaneously stores the document sheets as image data in a file memory, and then transmits the image data to a print process controller 65, which controls an electrostatic copying process using laser light, to form the image data into copy images to be transferred onto papers. The transfer papers are delivered to a sorter (not shown) and, after finishing the predetermined number of copies, a sorter controller 75 executes postprocessings like a staple processing set on the keyboard 64.

The printer function of the first digital copier 15 is achieved by use of the print process controller 65 used in the above copy machine function, a communication controller 70 for communication with the network for receiving data to be printed, a file memory 67 for temporarily storing the data received from the network, a font memory 62 for unwinding the data stored in the file memory 67 so that the data can be printed, and a main controller 61 for controlling all of the above units at the same time.

Then, the transfer papers that the printing has done are delivered to the sorter and, after finishing the predetermined number of copies, being set by the host computer WS1 or WS2, or set at the digital copier 15 or 16, the sorter controller 75 executes postprocessings like the staple processing set by the host computer WS1 or WS2, or set at the digital copier 15 or 16.

The respective units are integrated with the main controller 61 directly from a common data bus 71, or via an input controller 63, a display controller 68 or an I/F 76. The main controller 61 is constituted of unillustrated CPU, program memory, data memory, etc.

When the first digital copier 15 acts as a printer, the main controller 61 takes print data delivered from the host computer received in a network interface 72 and the communication controller 70 through the network of FIG. 1, and executes data processing such as to unwind the print data according to page description language (PDL) or the like. The main controller 61 then controls printing on paper, sorting of the paper and postprocessing together with process control for printing.

Also, when the first digital copier 15 acts as a copy machine, the main controller 61 reads out document image data through the image reader controller 73 while it controls the automatic document feeder (not shown) in the document feeder controller 74. The main controller 61 then executes the process control for printing while it controls processing of the image data, such as gradation processing or the like, to execute printing on paper, sorting of the paper, and postprocessing.

The input controller 63 is connected to the keyboard 64 on which commands can be input so as to switch the digital copiers 15 and 16 between printer mode and copy machine mode.

The keyboard 64 also has data and command input functions for executing file retrieval, text editing, initialization of the digital copier interface, and the like, in the print mode. On the other hand, in the copy mode, various kinds of data and commands are input from the keyboard 64 or the mouse (not shown) for setting the number of copies, switching both sides/one side, switching enlargement/reduction, setting copy gray level, setting sorting mode, staple processing yes/no, starting copy, etc.

The input controller 63 is then connected to a reset controller 66 which generates signals at the time of supplying the main power to the digital copier or pushing the reset button for initializing the main controller 61 or application softwares. One key on the keyboard 64 or the main reset button of the copier can be used for the reset controller 66.

The display controller 68 is connected to a liquid crystal display (LCD) 64 to display the digital copier status as well as the data or command inputs set on the keyboard 64 or the mouse (not shown).

Though the first and second digital copiers 15 and 16 have the same structure, if their addresses are different from each other on the network, both of them can be operated at the same time.

Software Structure of the Host Computer

Figure 5:
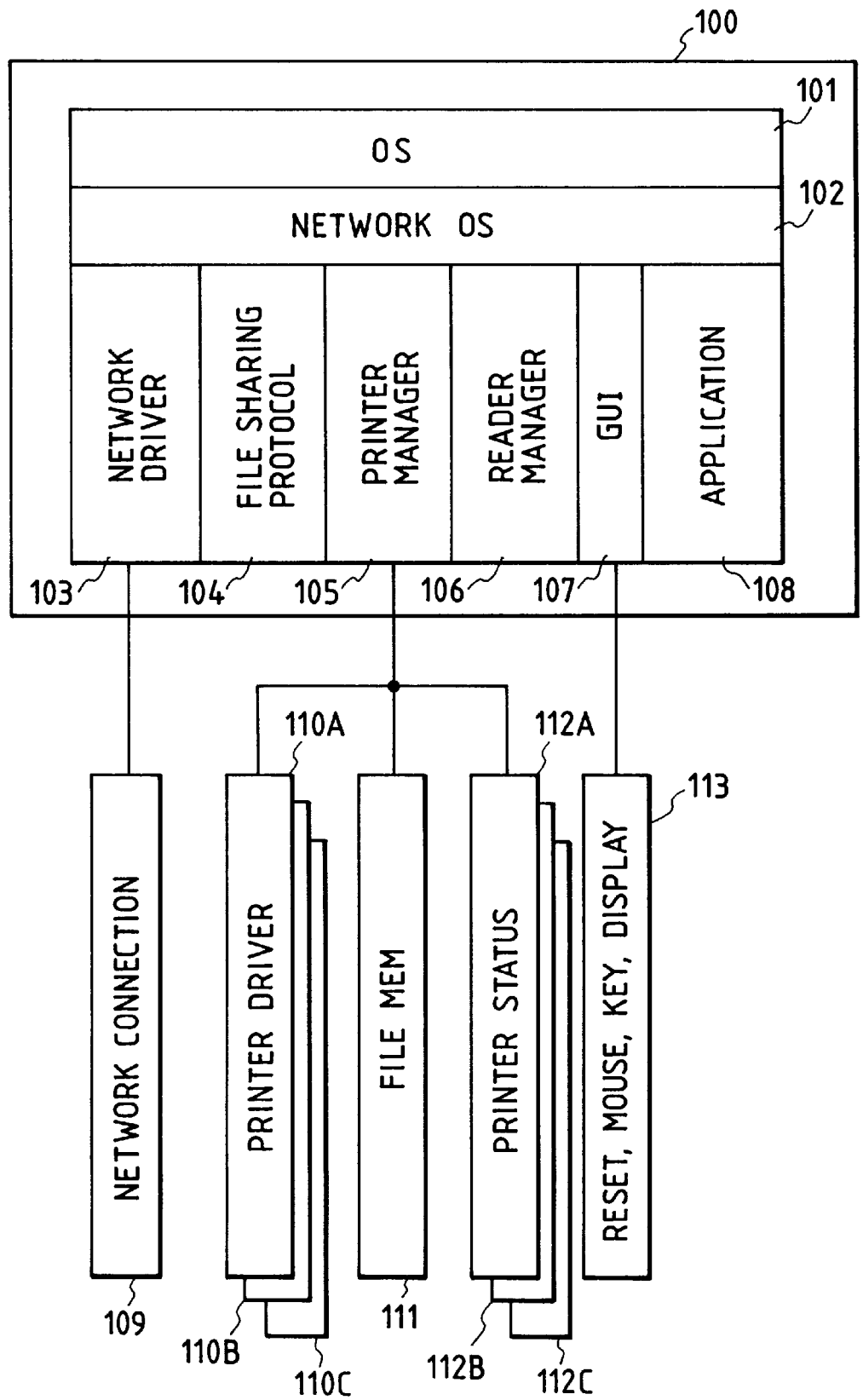
FIG. 5 is a diagram showing a software structure of the host computer.

FIG. 5 shows a software structure of the first host computer WS1 and the second host computer WS2.

The first host computer WS1 stores an operating system and many application programs in a mass memory like the magnetic disk memory 27 of FIG. 2. This software 100 includes an operating system 101 used for control of the hardware parts and switching applications software to be run, a network operating system 102 used as a core for hardware control of the network and communication control, several kinds of application software and a set of driver softwares.

The network operating system 102 sends and receives data based upon a logical network address. The network operating system 102 also has a function to suck packet data addressed to itself on the network.

The network driver softwares 103 controls switching data and messages between various application softwares connected through the network.

A file sharing protocol 104 incorporates application software or driver softwares obtained through the network driver software 103 into the corresponding machine, and assigns a virtual drive necessary for the above application software.

A printer manager 105 manages status informations 112A, 112B and 112C, such as printer status, functions, additional devices and machine type names of printer or digital copier connected to the network. Also, it drives a desired printer, or printer driver software 110A, 110B or 110C unwinding PDL for the desired printer. The printer manager 105 manages a print file 111 to be printed as well. The results of processings or status information is displayed on the CRT through a GUI 107.

A reader manager 106 is also added to the structure. The reader manager 106 manages status informations, such as status, functions, additional devices and machine type names of readers connected to the network. Also, it drives respective drivers, or reader driver software which reads image data in the respective readers. The reader manager 106 then manages an image data file to be stored. The results of processings or status informations are displayed on the CRT through the GUI 107 as well as those of the printer driver software.

Software Structure of Printer

Figure 6:
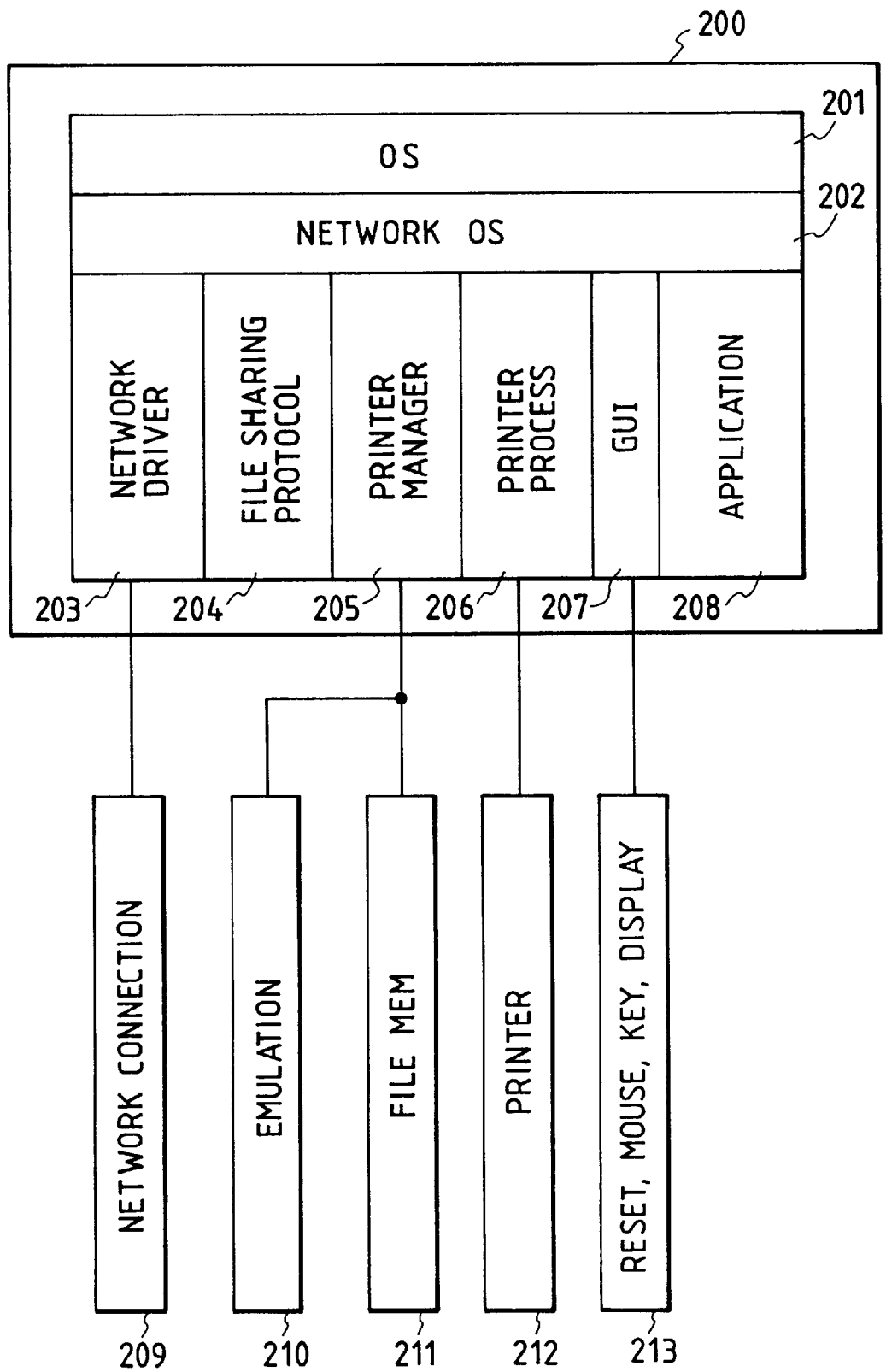
FIG. 6 is a diagram showing a software structure of the printer.

FIG. 6 shows a software structure of the first printer PT1 and the second printer PT2.

Printer software 200 includes, as well as that of the host computer WS1, an operating system 201, a network operating system 202, a network driver 203, a file sharing protocol 204, several kinds of applications software and a set of driver softwares.

A printer manager 205 sends status information, such as printer status, functions, additional devices and machine type names, according to requests from the host computer connected to the network or a client, or transmits the status informations to the host computer connected to the network or the client at predetermined timing. Also, the printer manager 205 makes print data delivered from the host computer or the client stored in a file memory, and controls emulation software which changes the print data into a data file capable of printing, or the printer driver software, which unwinds the PDL for many printers.

The file memory to be printed is controlled by a printer process 206 and printed in the printer. The results of processings or status information is displayed on the CRT through a GUI 207.

Software Structure of Digital Copier

Figure 7:
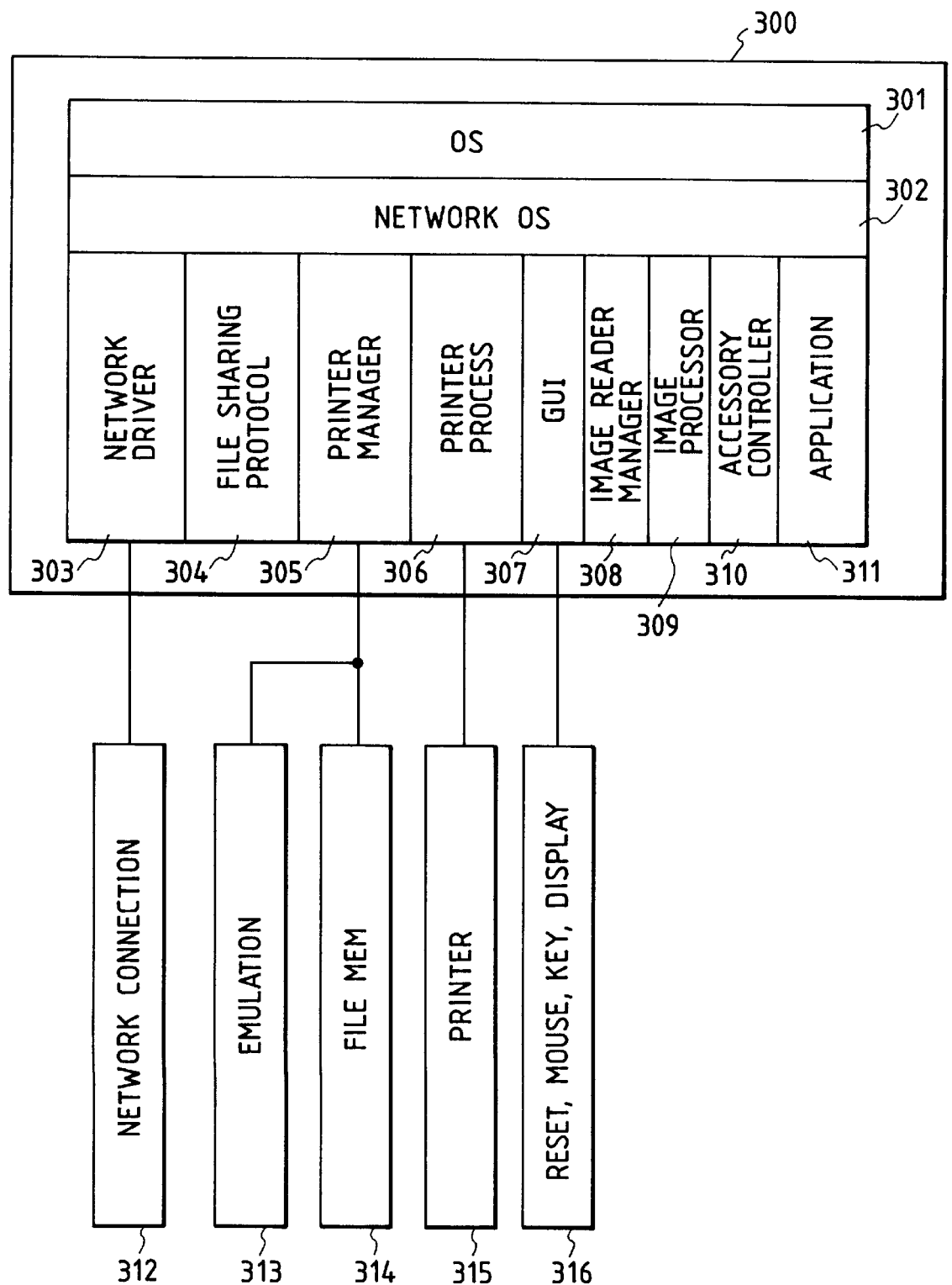
FIG. 7 is a diagram showing a software structure of the digital copier.

FIG. 7 shows a software structure of the first digital copier 15 and the second digital copier 16.

Digital copier software 300 includes, as well as that of the host computer WS1, an operating system 301, a network operating system 302, a network driver 303, a file sharing protocol 304, several kinds of application software and a set of driver software.

A printer manager 305 sends status information, such as digital copier status, functions, additional devices and machine type names, according to requests from the host computer connected to the network or the client, or transmits the status information to the host computer connected to the network or the client with predetermined timing. Also, the printer manager 305 makes print data delivered from the host computer or the client stored in a file memory, and controls emulation software which changes the print data into a data file capable of printing or the printer driver software which unwinds the PDL for many printers.

The file memory to be printed is controlled by a printer process 306 and printed in the printer 315. The results of processings or status information is displayed on the liquid crystal display 69 of the digital copier through a GUI 307.

An image reader 308 controls the document feeder using an accessory controller 310 to read the document fed by the document feeder. An image processor 309 then eliminates noise from the data read by the image reader 308 and creates an image reader file.

Depending upon setting of operating parts of the digital copier, the image data can be printed directly in the printer to create the desired number of copies by sorting the prints using the sorter, etc.

Setting of Peripheral Status Data in Host Computer

FIG. 8 shows a processing flow in the host computer for inputting status values of the respective peripherals connected through the network, such as the first printer PT1, the second printer PT2, the first digital copier 15 and the second digital copier 16, and storing the status values to the memory inside the CPU 21.

In the host computer, for example, when printing a predetermined file at a printer, one printer is selected from referring to the status values of the peripherals based on a predetermined selection standard. The print data is then output to the selected printer and printed.

Referring to FIG. 8, the process of setting status values of the respective peripherals, which is processed in the host computer, will be described below. The description will be first started at step S1000, with connecting the host computer to the power supply.

After supplying the power, initialization of I/0 device in the host computer and a check of internal memories are executed at step S1001.

At step S1002, the network driver software 103 and the printer manager 105 are loaded into the operating system 101 and the network operating system 102, whereby the communication through network can be carried out. Also, this makes it possible to execute print request processing at the printers connected through the network. Next, it goes to step S1006 to make an entry into a process of obtaining status information about each peripheral.

Entry into the above process is done with power on as a start, as mentioned at step S1002, however, other ways can be used for the entry, for example, as mentioned at the following steps S1003, S1004 and S1005.

1) At the time of pushing a predetermined key on the keyboard 24, or the reset button switch 26, the CPU 21 inputs this data via the input controller 23 and it goes to next routine starting from step S1006 (see step S1003 of FIG. 8).

2) An application (not shown) for initialization of registered devices built in the host computer is started. The above application software calls processing routines starting from step S1006 to execute the process of obtaining status information of each peripheral (see step S1005 of FIG. 8).

As an aside, the application software for initialization of registered devices can be executed by calling it from a user application software, or started with a command input from the keyboard 24.

3) A predetermined peripheral status setting request data is input from each peripheral through the network, and the processing starting from step S1006 is executed (see step S1004 of FIG. 8). The peripheral status setting request data is a predetermined data output to the host computer, for example, when the peripherals have been enabled to execute the processing based upon the request from the host computer after supplying the power. The predetermined peripheral status setting request data, for example, even when the processing has been inhibited in the printer due to the printing medium running out or the like, can be output to the host computer.

Next, the process of actually obtaining status information of each peripheral will be described below.

At step S1006, the peripherals connected to the network are called. The printer manager 105 communicates the calling data to the peripherals by broadcast communication so that all of the peripherals on the network receive the calling data, and sends to the network an internet protocol IP address for peripheral stored in the magnetic disk. The peripheral corresponding to the IP address informs the host computer of a MAC (Media Access Control) address equivalent to the physical address on the network. The host computer inputs the MAC address to check that address, whereby it is confirmed that the peripheral corresponding to the address was able to connect with the host computer.

On the other hand, if the peripheral corresponding to the IP address is not connected to the network, or if power is not supplied thereto, there is no response from the MAC address. In consideration of the above case, a predetermined acceptable time period from output of the IP address to the network up to input of the MAC address is set inside the host computer. After the acceptable time period has passed, the printer manager retrieves a printer status management table, if the device status information of the peripheral corresponding to the output IP address is registered, the corresponding device status information is removed from the printer status management table so as to inhibit the service request to the corresponding peripheral.

After that, another IP address, for the next peripheral, is transmitted to the network.

At step S1007, the printer manager 105 secures a channel to the corresponding peripheral, and then receives peripheral driver software data from the corresponding peripheral, for driving the same.

Since each peripheral has stored the driver software in a built-in memory in advance for driving the peripheral itself, the above driver software is transferred to the host computer based upon the transfer request from the host computer.

Then, at step S1008, the host computer inputs the driver software to put it under the control of the operating system 101, so that the peripheral can be driven by using the driver software, thus in effect the application software into the operating system.

At step S1009, device status information (see FIGS. 22 to 26) included in the peripherals are taken in. The details of the device status information of FIGS. 22 to 26 will be described later.

At step S1010, it is checked whether all of the devices on the network have been called completely. If not, the process returns to step S1006, and the routines from steps S1006 to S1009 are repeated till the all of the devices are called. If done, the channel to the network is cut off, the resource used in the process is released and it goes to step S1011.

At step S1011, it is checked whether the GUI display mode is set. If done, the process goes to step S1012. On the other hand, if it is set to any mode other than the GUI display mode, the process will be finished.

At step S1012, the display order of the peripherals registered inside the host computer are optimized, then, at step S1013, the GUI display (see FIGS. 16 to 21) is executed in the optimized order and the process is finished. The detail of FIGS. 16 to 21 will be described later.

Initialization of Printer

Referring next to FIG. 9, the initialization process to make the printer executable will be described at respective steps. The description is started at step S1100 with connecting the printer to the power supply.

After the power supply has risen, the initialization of I/O device and the check of internal memories are executed at step S1101 in the same manner as those of the host computer.

At step S1104, the host computers connected to the network are called. The printer manager 205 of the printer sends to the network an IP address for host computer stored in a nonvolatile memory, not shown, of the main controller 41. On the other hand, the corresponding host computer detects the IP address, and then sends to the network a MAC address for the host computer.

The printer manager 205 receives this MAC address to secure a channel to the network, and then sends to the host computer printer driver software data for driving the printer itself, such as printer emulation software data or the like.

At step S1105, the printer manager 205 sends, via the network to the host computer, printer status data (see FIGS. 23 and 24), such as printer type name, performance of how many paper sheets can be printed per minute, supplies like paper or toner, etc. After the end of sending the printer status data, the channel to the network is cut off and the resource used in the process is released.

In addition, when the main controller has received the reset signal from the reset button 46 or the like, the routines of steps S1104 and S1105 are run to send the print emulation software and the printer status data.

Response of Printer to Host Computer

Next, the response process of the printer to the status data transmission request delivered from the host computer will be described with reference to FIG. 10.

In the condition that the printer has been connected to the power supply to make the printer executable, when the status data transmission request data is received from the host computer through the network, then the printer runs the following routines.

At step S1151, the printer compares the host computer IP number registered in a nonvolatile memory, not shown, of the main controller with the IP number included in the received status data transmission request data to confirm the matching. If not matching, the printer determines that the request was sent from an incorrect host computer and finishes the process.

At step S1152, the printer sends, to the corresponding host computer, data of specific application program like a print emulation software for driving the printer itself. At step S1153, the printer then checks its own status data, that is, printer type name, performance of how many paper sheets can be printed per minute, supplies like paper or toner, and the like. At step S1154, the status data (see FIG. 23) is sent to the host computer, and after the end of sending the data, the channel to the network is cut off and the resource used in the process is released.

Initialization of Digital Copier

Figure 11:
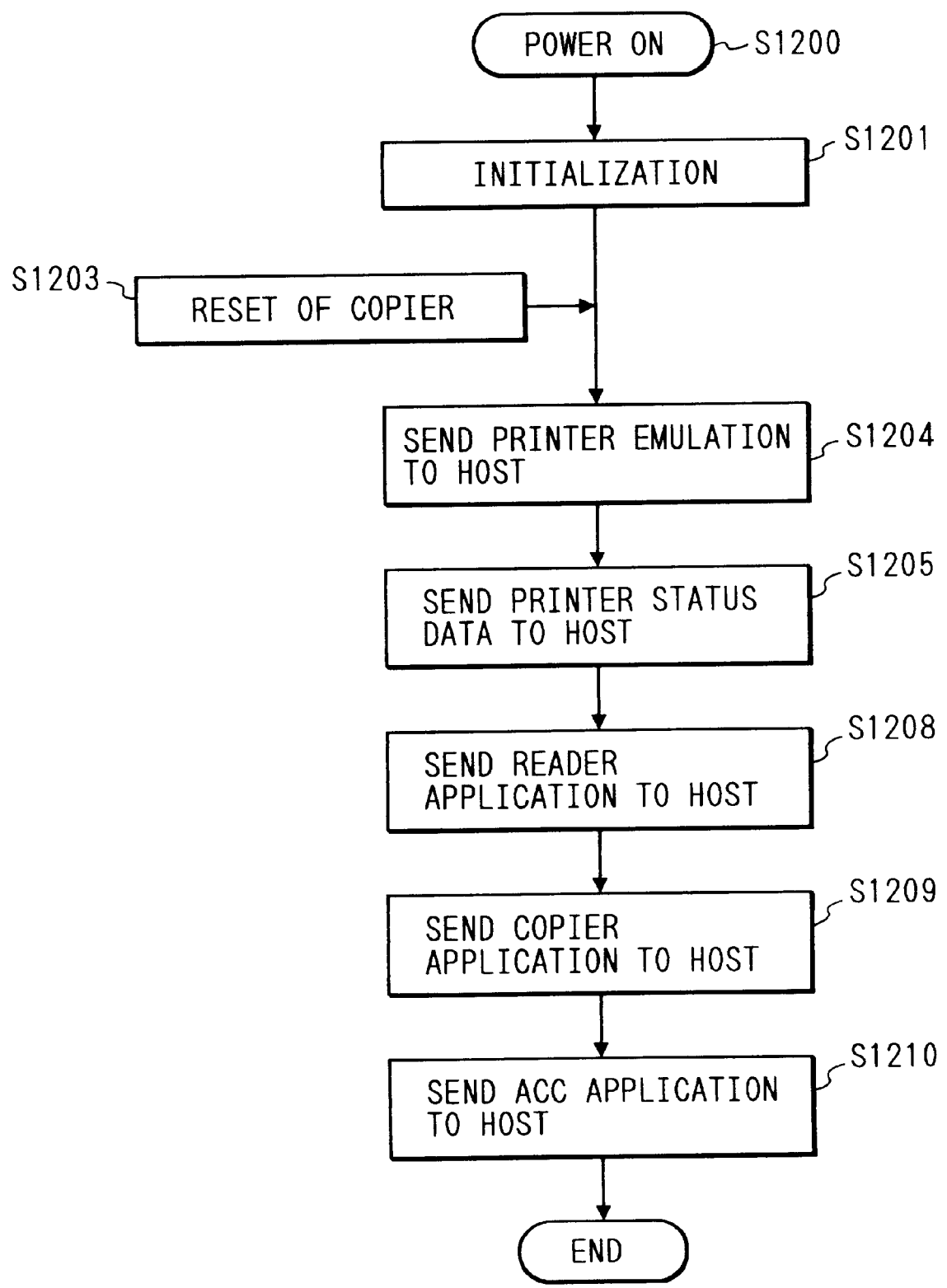
FIG. 11 is a flow chart showing an initialization process in the copier.

Referring next to FIG. 11, the initialization process to make the digital copier executable will be described at respective steps. The process is started at step S1200 with supplying the power to the printer.

After the power supply has risen, the initialization of I/O device and the check of internal memories are executed at step S1201 in the same manner as those of the host computer.

At step S1204, the host computers connected to the network are called. The printer manager 305 of the digital copier sends to the network an IP address for host computer stored in a nonvolatile memory, not shown, of the main controller 61. On the other hand, the corresponding host computer detects the IP address, and then sends to the network a MAC address for the host computer.

The printer manager 305 receives this MAC address to secure a channel to the network, and then sends to the host computer, printer driver software data for driving the printer itself, such as printer emulation software data or the like.

At step S1205, the printer manager 305 sends, via the network to the host computer, printer status data (see FIGS. 25 and 26), such as type name, performance of how many paper sheets can be printed per minute, supplies like paper or toner, and the like. After end of sending the printer status data, the channel to the network is cut off and the resource used at the process is released.

At step S1208, reader application software is sent to the host computer when the reader controller of the copier is used for the image data. At step S1209, application software for a copier, such as for the image editing processing of the copier or driving the FAX mode, is sent to the host computer. Then, at step S1210, ACC application software, such as for driving the sorter, the document feeder, or the staple processing, is sent to the host computer.

In addition, when the main controller has received the reset signal from the reset button 66 or the like of the digital copier, the routines of steps S1204 and S1210 are run, so that the print emulation software and the digital copier status data are sent to the host computer, in addition to which various application software is built in.

Response of Digital Copier to Host Computer

Figure 12:
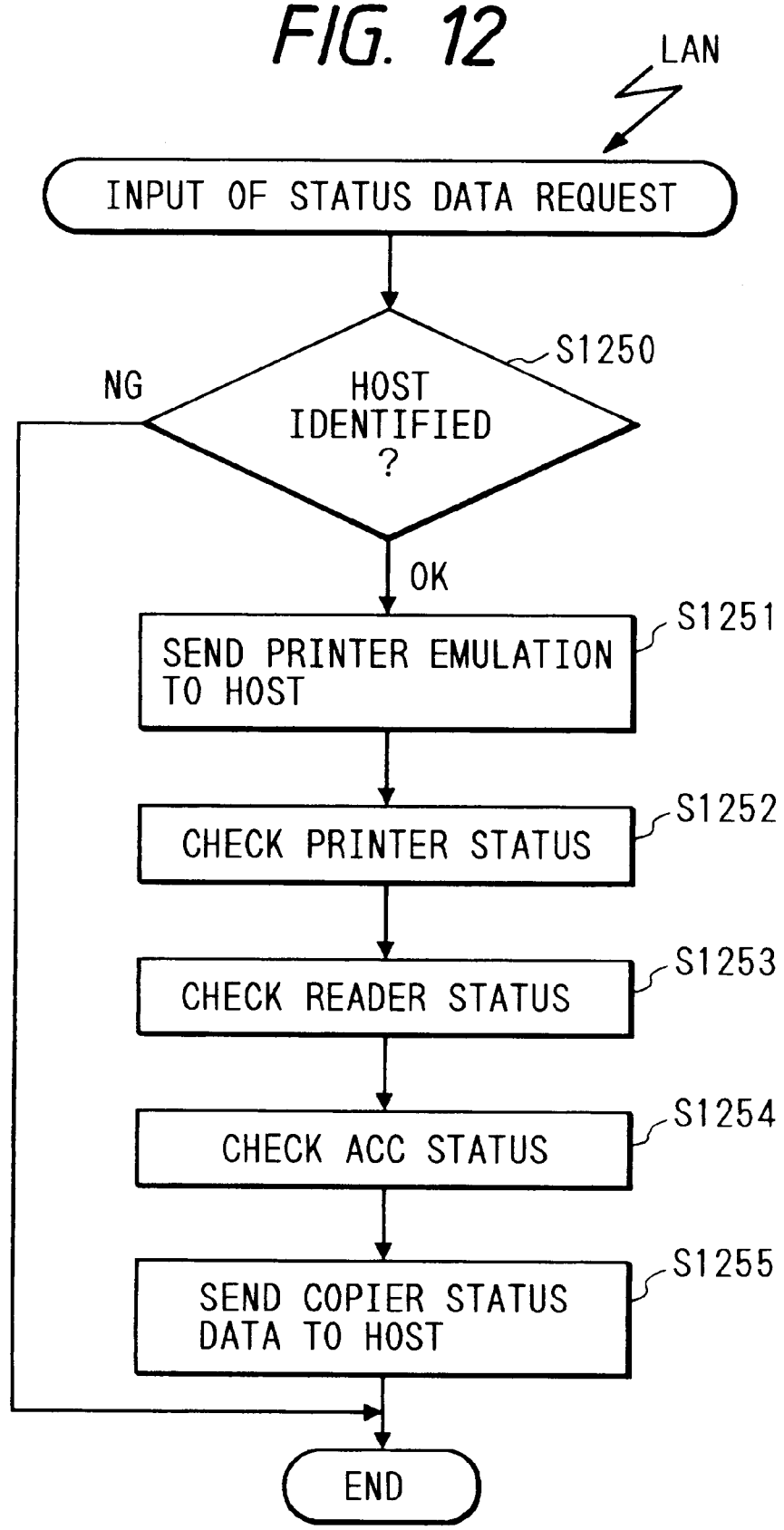
FIG. 12 is a flow chart showing a response of the copier to the host computer.

Next, the response process of the digital copier to the status data transmission request delivered from the host computer will be described with reference to FIG. 12.

In the condition that the digital copier has been connected to the power supply to make the digital copier operable, when the status data transmission request data is received from the host computer through the network, then the digital copier runs the following routines.

At step S1250, the digital copier compares the host computer IP number registered in a nonvolatile memory, not shown, of the main controller with the IP number included in the received status data transmission request data to confirm the matching. If not matching, the digital copier determines that the request has sent from an incorrect host computer and finishes the process.

At step S1251, the digital copier sends, to the corresponding host computer, data of a specific application program like a printer emulation program for driving the digital copier itself.

At step S1252, the digital copier then checks its own status data, that is, type name, performance of how many paper sheets can be printed per minute, supplies like paper or toner, and the like. At step S1253, the status data, such as for resolution of the image reader and the like, are checked. Also, at step S1254, the status data, such as for no ACC needle, supplies like paper or toner yes/no, and the like, are checked.

Then, at step S1255, the above digital copier status data (see FIGS. 25 and 26) are sent to the host computer. After the end of sending the data, the channel to the network is cut off, the resource used in the process is released, and the process is finished.

Second Embodiment

Figure 13:
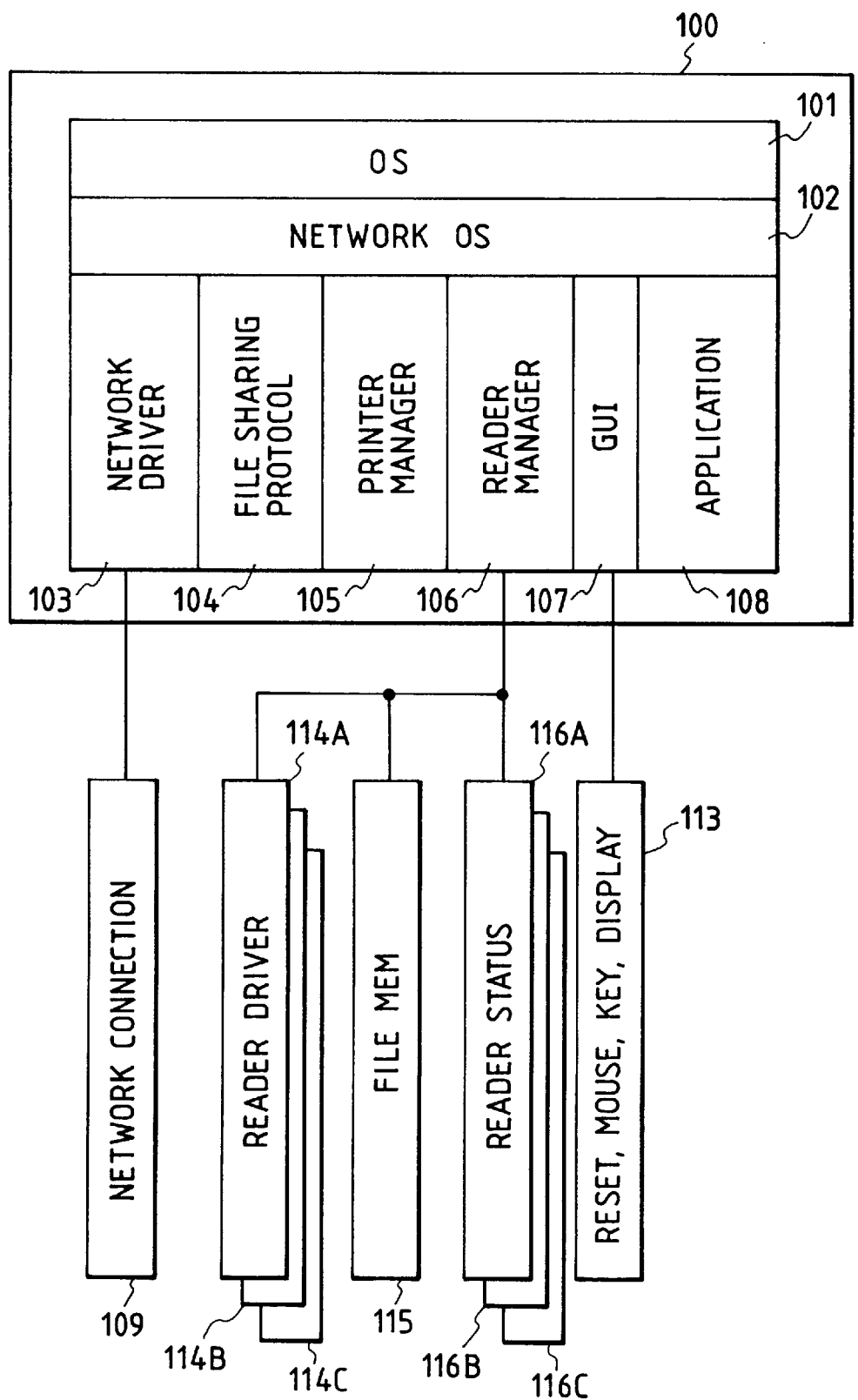
FIG. 13 is a diagram showing another software structure of the host computer.
Figure 14:
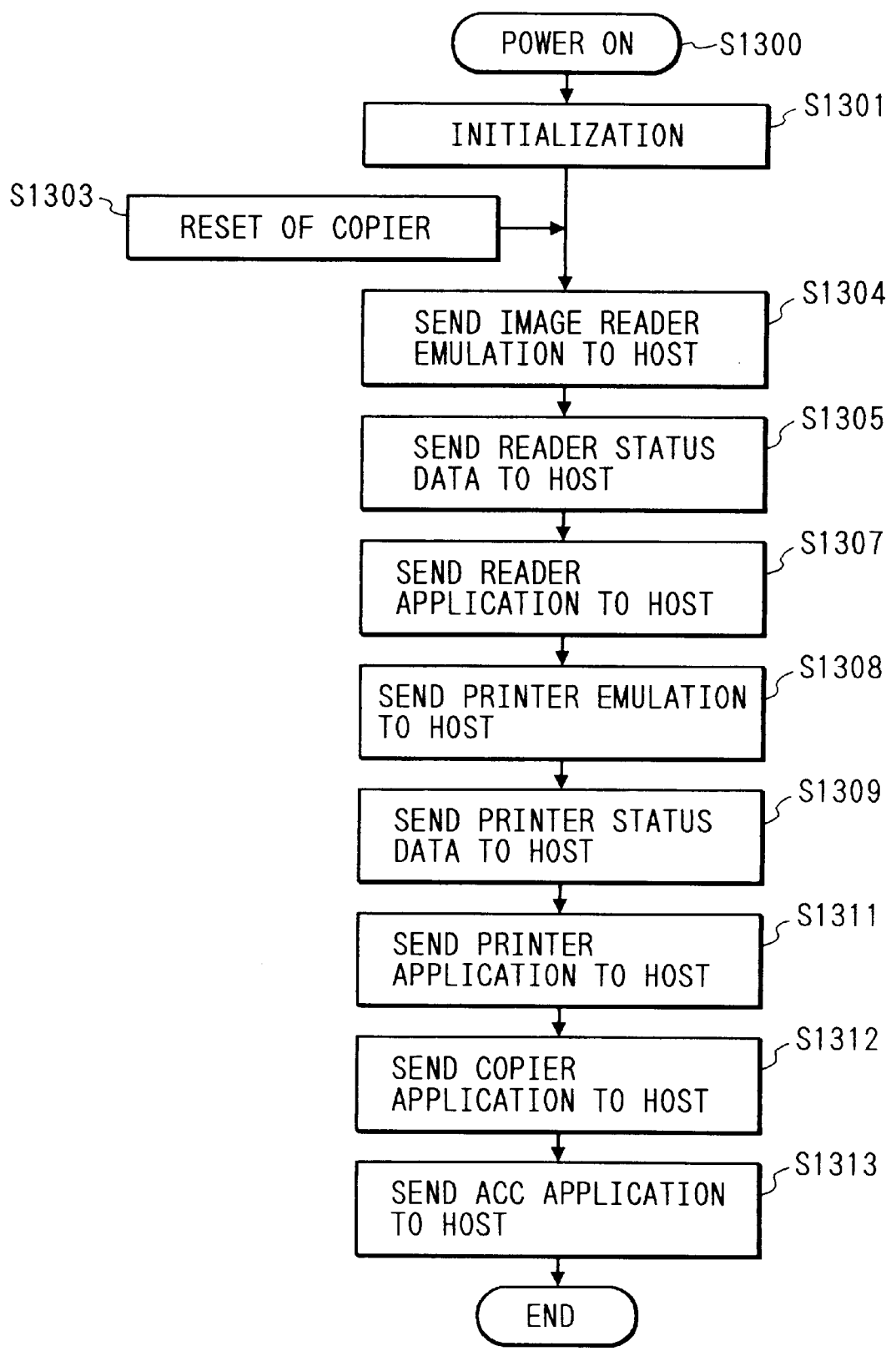
FIG. 14 is a flow chart showing another initialization process in the copier.
Figure 15:
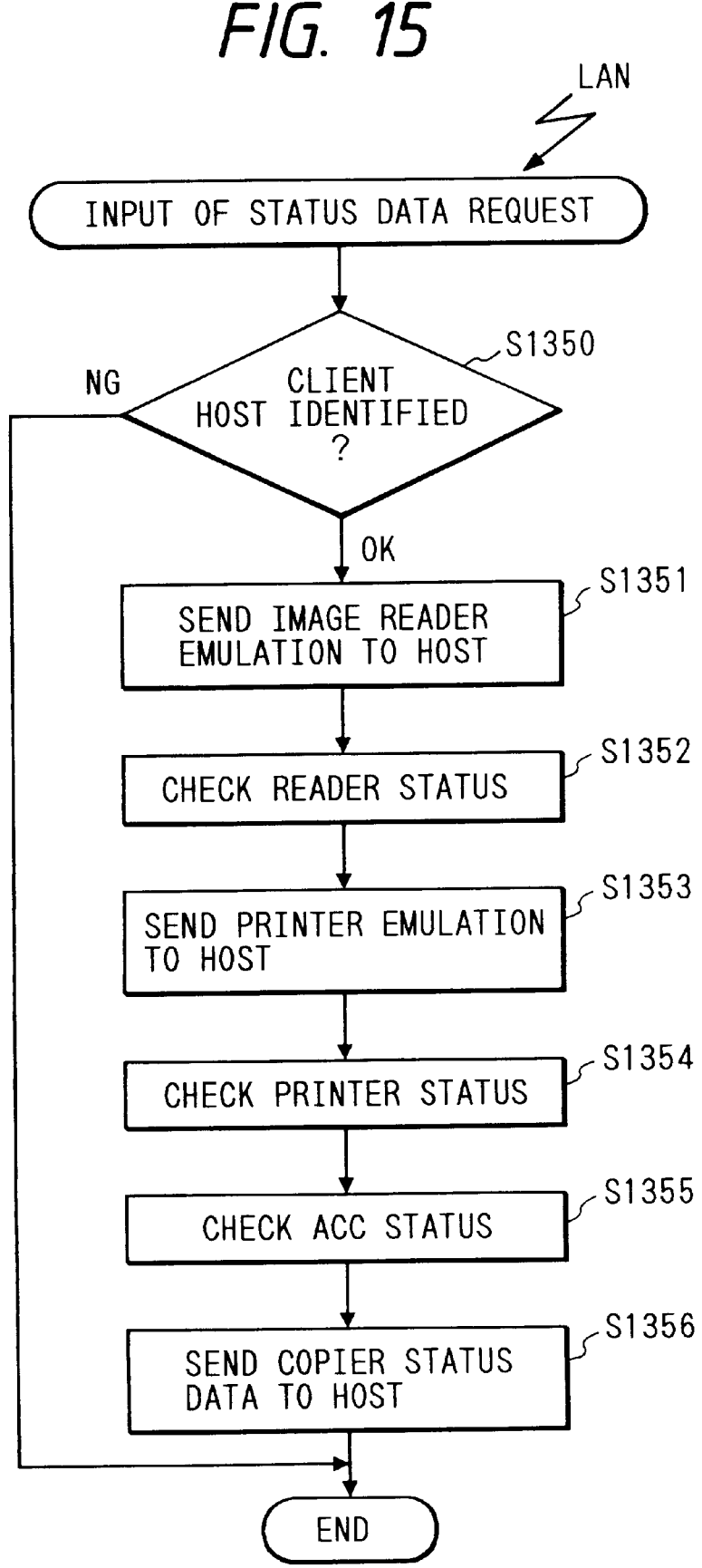
FIG. 15 is a flow chart showing another response of the copier to the host computer.

A structure of the reader manager to control the image reader of the digital copier will be described with reference to FIGS. 13, 14 and 15.

The reader manager 106 of the host computer manages status information 116A, 116B and 116C of the image reader connected to the network, such as status, functions, additional devices and the machine type names. The reader manager 106 then drives the respective reader or reader driver programs 114A, 114B and 114C which read image data for the respective image reader. The reader manager 106 also manages the image data file 115 to be stored. The results of processings or status information is displayed on the CRT through the GUI 107 as well as the printer driver software.

Referring next to the initialization process flow of the digital copier shown in FIG. 14, the initialization process to make the digital copier executable will be described at respective steps.

Initialization of Digital Copier with Image Reader

The description is started at step S1301 with supplying the power to the digital copier.

After the power supply has risen, the initialization of I/O device and the check of internal memories are executed at step S1301 in the same manner as those of the host computer.

At step S1304, the host computers connected to the network are called. The image reader manager 308 of the digital copier sends to the network an IP address for host computer stored in the nonvolatile memory, not shown, of the main controller 61. On the other hand, the corresponding host computer detects the IP address, and then sends to the network a MAC address for the host computer.

The image reader manager 308 receives this MAC address to secure a channel to the network, and then sends to the host computer an image reader driver software data for driving the image reader itself, such as image reader emulation software data or the like.

At step S1305, the image reader manager 308 sends, via the network to the host computer, image reader status data (see FIGS. 25 and 26), such as type name of reader itself and the resolution. After end of sending the image reader status data, the channel to the network is cut off and the resource used at the process is released.

At step S1307, the image reader application software for driving the reader controller of the digital copier is sent to the host computer. At step S1308, the host computers connected to the network are called. The printer manager 305 of the digital copier sends to the network an IP address for host computer stored in the nonvolatile memory, not shown, of the main controller 61. On the other hand, the corresponding host computer detects the IP address, and then sends to the network a MAC address for the host computer.

The printer manager 305 receives this MAC address to secure a channel to the network, and then sends to the host computer the printer driver software data for driving the printer itself, such as printer emulation software data or the like.

At step S1309, the printer manager 305 sends, via the network to the host computer, printer status data (see FIGS. 25 and 26), such as printer type name, performance of how many paper sheets can be printed per minute, supplies like paper or toner, and the like. After the end of sending the printer status data, the channel to the network is cut off and the resource used in the process is released.

At step S1311, the print application software is sent to the host computer. At step S1312, the copier application software is sent to the host computer as well. Then, at step S1313, the ACC application software for driving staple or the like is sent to the host computer.

In addition, when the main controller 61 has received the reset signal from the reset button 66 or the like of the digital copier, the routines of steps S1304 and S1313 are run.

Response of Digital Copier to Host Computer

Next, the response process of the digital copier to the status data transmission request delivered from the host computer will be described with reference to FIG. 15.

In the condition that the digital copier has been connected to the power supply to make the digital copier executable, when the status data transmission request data is received from the host computer through the network, then the digital copier runs the following routines.

At step S1350, the digital copier compares the host computer IP number registered in the nonvolatile memory, not shown, of the main controller with the IP number included in the received status data transmission request data to confirm the matching. If not matching, the digital copier determines that the request was sent from an incorrect host computer and finishes the process.

At step S1351, the digital copier sends, to the corresponding host computer, data of a specific application software like an image reader emulation software for driving the digital copier itself.

At step S1352, the digital copier then checks status data of the image controller inside the digital copier, that is, the reader type name, the resolution, etc. At step S1353, the printer emulation software is sent to the host computer. At step S1354, the printer status is checked. At step S1355, the ACC status is checked as well.

Then, at step S1356, the above digital copier status data is sent to the host computer. After the end of sending the status data, the channel to the network is cut off and the resource used in the process is released.

GUI Display

In FIGS. 16 to 21, examples of GUI display on the host computer screen will be described.

Figure 16:
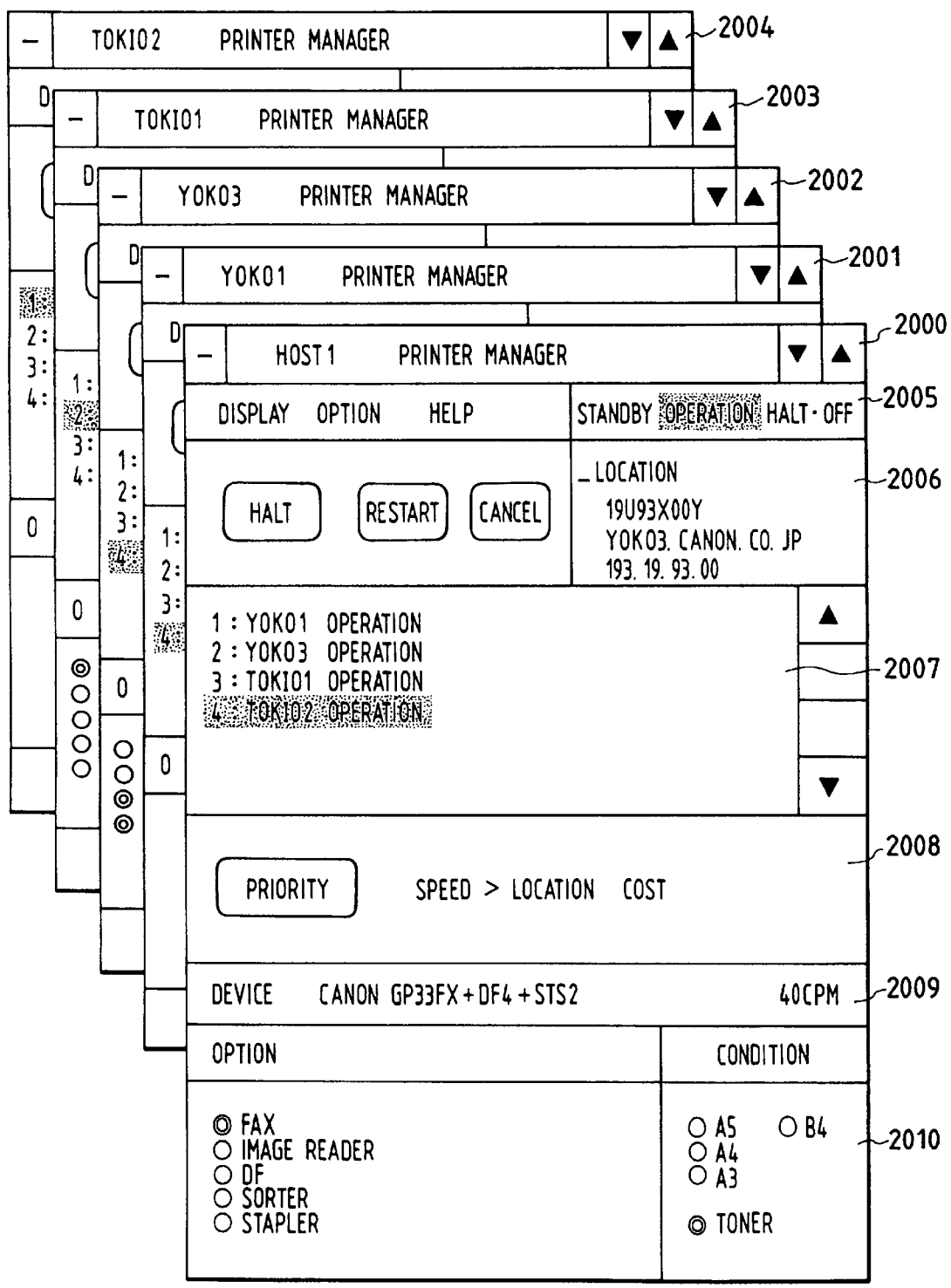
FIG. 16 is a diagram showing windows on the CRT of the host computer for displaying both list information concerning the peripherals and information for each peripheral.

FIG. 16 shows an example of a display screen on the CRT of the host computer, in which the information concerning all of the printers connected to the network is displayed in the shape of a cascade.

Assuming that the network 17 connects with a printer "YOKO 1" (corresponding to first printer PT 1 of FIG. 1), a printer "YOKO 3" (corresponding to second printer PT 2 of FIG. 1), a digital copier "TOKI 01" (corresponding to first digital copier 15 of FIG. 1), a digital copier "TOKI 02" (corresponding to second digital copier 16 of FIG. 1), these printers being isolated from each other. The arrangement of printers is the same as that of FIG. 3.

FIG. 17 is a diagram taking only a window 2000 concerning the host computer out of FIG. 16.

Referring to FIGS. 16 and 17, information concerning the printer "YOKO 1" is displayed through a window 2001. Information concerning the printer "YOKO 3" is displayed through a window 2002 as well. Information concerning the printer "TOKI 01" is then displayed through a window 2003, and information concerning the printer "TOKI 02" is then displayed through a window 2004.

The windows 2001 to 2004 display statuses of the respective peripherals and include menus for selection of all kinds of operated options respectively.

The window 2000 is provided for displaying operation statuses of the above four printers at the same time, and executions of the printers are managed by the first host computer WS1.

Then, an area 2007 shows the execution status of each printer that is managed by the first host computer WS1. The fourth line of the area 2007, the line of the printer "TOKI 02", is masked by a shaded rectangle, and this denotes that the operator is now selecting the printer "TOKI 02" using the keyboard 24 or the mouse 25. After selecting, the printer manager 105 designates the status of the selected device from selective statuses in an area 2005, that is, "STANDBY", "OPERATION", "HALT" and "OFF", by masking with the netlike rectangle. In this example, the printer "TOKI 02" is in operation.

An area 2006 of the window 2000 shows the location coordinate where the first host computer WS1 is installed. Also, an area 2007 displays the status of each device which is under the control of the host computer WS1. In this example, the printers "YOKO 1", "YOKO 3", "TOKI 01" and "TOKI 02" are all in operation.

An area 2008, if there is data to be printed, shows a plurality of decision standards as to which printer is selected, i.e., designates a relationship of priorities on "STANDBY", "WAITING TIME", "SPEED", "LOCATION" and "COST". For example, a relationship of "LOCATION">"SPEED" means that a printer located closest to the host computer has priority over the other printers, or if two or more printers are located at the same location, then a printer capable of printing at the highest speed has priority over the other printers. Or, if these printers are located at the same location and can take a copy at the same speed, then the printer of which cost per paper is lowest has priority over the others. In default, the relationship is defined in order of "STANDBY>WAITING TIME>COST>LOCATION>SPEED."

An area 2009 shows the device name of printer "TOKI 02" designated in the area 2007. An area 2010 then displays paper size used in printing at the printer "TOKI 02". In this area, a double circle shows the selected one.

Referring now to FIG. 18, the window 2001 for the printer "YOKO 1" will be described, which is displayed in the area 2007 of the host computer window 2000.

In this drawing, an area 2807 shows a display area of respective file names which is now printing at the printer "YOKO 01". In the area 2807, the fourth line, the line of "KAZU 1" is masked with the netlike rectangle, and this denotes that this file is now printing. An area 2805 shows this status of the file, that is, it shows any of "STANDBY", "OPERATION", "HALT" and "OFF".

An area 2806 shows the location coordinate where the printer "YOKO 1" is installed. Also, an area 2807 displays the status of each file which is being processed by the printer "YOKO 01". In this example, the area 2807 displays that files "KAZU 0", "KAZU 2" and "KAZU 3" have been already printed out, and that the file "KAZU 1" is now in printing.

An area 2809 shows the device name of the printer. An area 2810 then displays paper size used in printing now. In this area, a double circle shows the selected one. Here, the operator can select the paper size using the mouse 25 or the keyboard 24.

FIG. 19 shows a structure of the window 2002 for the printer "YOKO 3" displayed in the area 2007 of the host computer window 2000. The structure is the same as that of FIG. 18.

FIG. 20 shows a structure of the window 2003 for the digital copier "TOKI 01" displayed in the area 2007 of the host computer window 2000. Also, the structure is the same as that of FIG. 18.

FIG. 21 shows a structure of the window 2004 for the digital copier "TOKI 02" displayed in the area 2007 of the host computer window 2000. Also, the structure is the same as that of FIG. 20.

Next, status data reserved by the respective devices are shown in FIGS. 22 to 26. These status data are recorded, e.g., the CPU or the main controller internal memory of each device.

FIG. 22 shows device status of the host computer. FIGS. 23 and 24 show device status of the printer. FIGS. 25 and 26 then show device status of the digital copier.

The status data structure of each device includes the machine proper name so that a new device can be easily extended to the network. In other words, the machine name is described at the column "IP" (see FIGS. 22, 23 and 25), and the model name is then described at the column "MAC" (see FIGS. 22, 23 and 25).

Location information where the corresponding device is installed is stored at the column "LOCATION" (see FIGS. 22, 23 and 25). The host computer refers to the location information to be used as one of parameters for selection of peripherals.

Execution status information of the device currently stated is stored at "PRINTER STATUS" (see FIG. 23), or "DIGITAL COPIER STATUS" (see FIG. 25). The host computer refers to the execution status information to be used as one of parameters for selection of peripherals.

Processing speed information of the corresponding device is then stored at the column "SPEED" (see FIGS. 23 and 25), and the host computer refers to the processing speed information to be used as one of parameters for selection of peripherals.

The column "PRINT RESOLUTION" (see FIGS. 23 and 25) shows the resolution at the time of printing. The column "RUNNING COST" (see FIGS. 23 and 25) stores, for example, the cost of printing medium or the like. The host computer also refers to the running cost information to be used as one of parameters for selection of peripherals.

The machine type name of the corresponding device is stored at the column "DEVICE NAME" (see FIGS. 22, 23 and 25), then the host computer refers to the running cost information to be used as one of parameters for selection of peripherals.

The manufacturing maker name of the device is stored at the column "MAKER NAME" (see FIGS. 22, 23 and 25), then the host computer refers to this maker name to be used as one of parameters for selection of peripherals.

The column of "READ RESOLUTION" stores the input resolution of the built-in image reader. The host computer refers to the read resolution to be used as one of parameters for selection of peripherals.

As mentioned above, the description was made concerning the main device status information.

Figure 27:
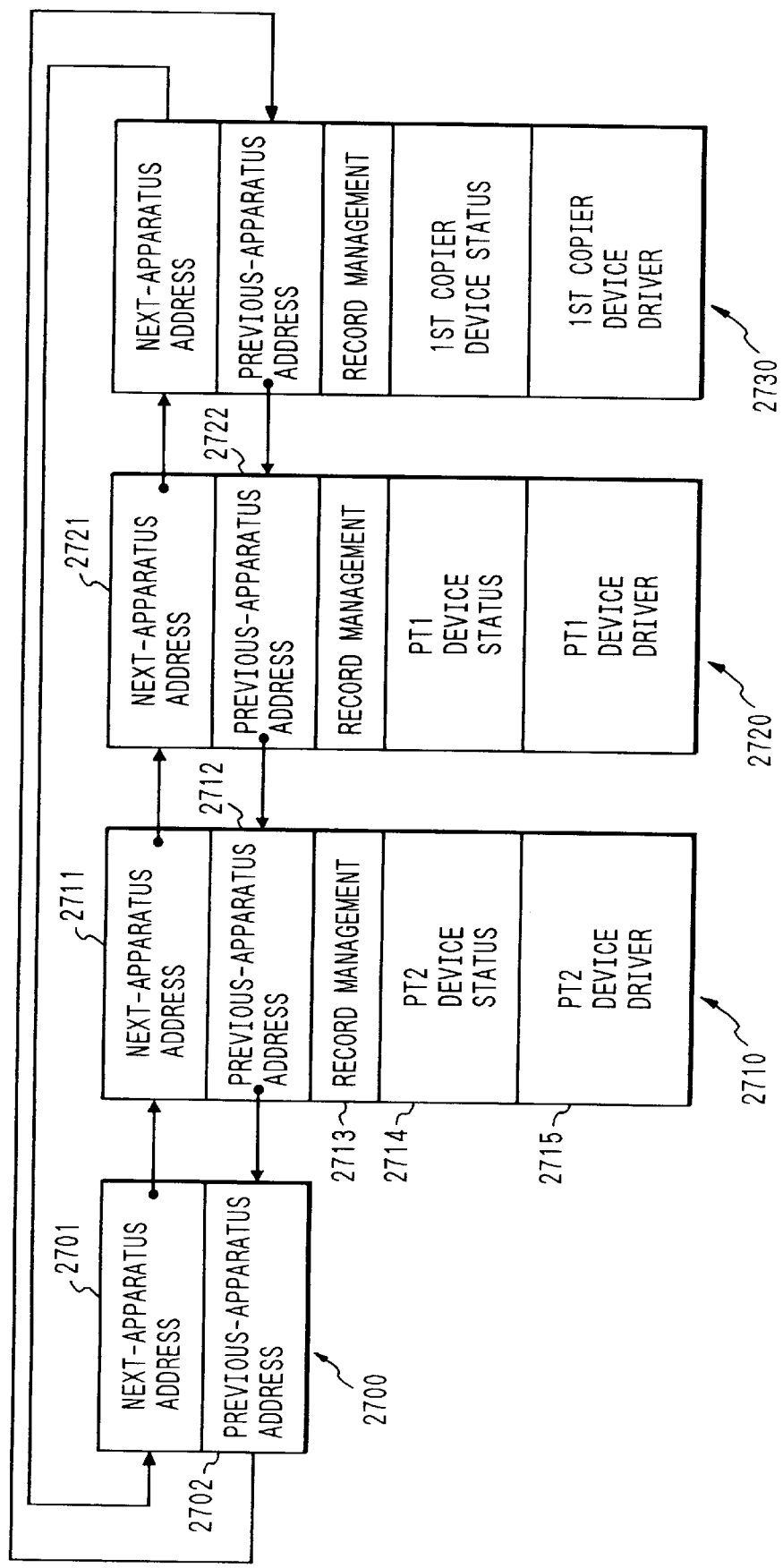
FIG. 27 is a diagram showing a data structure of status management data concerning each device controlled in the host computer.

Referring next to FIG. 27, a data structure of management data will be described. Here, the status information of each device is managed by the printer manager 105 of the host computer using this management data. The management data edits the device statuses transferred from respective peripherals and stored them in the magnetic disk memory 27.

A pointer part 2700 links management data of status informations together in respective devices. A status information data part 2710 stores the status data of the second printer PT2. A status information data part 2720 stores the status data of the first printer PT1. Then, a status information data part 2730 stores the status data of the first digital copier 15.

The above status information parts of the respective devices are the same data structure. These data parts are connected with each other in the shape of a ring, starting from the pointer part 2700 and using a forward pointer and a backward pointer.

A next-apparatus address 2701 of the pointer part 2700, which is used as the forward pointer, points at a top address of a next-apparatus address 2711 area in the status information data part 2710 of the second printer PT2. On the contrary, a previous-apparatus address 2712 of the status information data part 2710 of the second printer PT2, which is used as the backward pointer, points at a top address of a previous-apparatus address 2702 area in the pointer part 2700.

Similarly, from the status information data part 2710 of the second printer PT2, a next-apparatus address 2711, which is used as the forward pointer to the status information data part 2720 of the first printer PT1, points at a top address of a next-apparatus address 2721 in the status information data part 2720 of the first printer PT1. A previous-apparatus address 2722, used as the backward pointer, in the status information data part 2720 of the first printer PT1 then points at a top address of a previous-apparatus address 2712 in the status information data part 2710 of the second printer PT2.

Also, the forward pointer and the backward pointer are set between the status information data part 2720 of the first printer PT1 and the status information data part 2730 of the first digital copier 15.

In the same way, the forward pointer and the backward pointer are set between the status information data part 2730 of the first digital copier 15 and the pointer part 2700.

As described above, a loop-shaped link is formed between the pointer part 2700 and the status information data parts of the respective devices.

Next, each data structure of the status information data parts 2710, 2720 and 2730 of the devices will be described.

The status information data part 2710 of the second printer PT2 is constituted of a device driver 2715, a device status 2714, a record management 2713, and the previous-apparatus address 2712 and the next-apparatus address 2711 mentioned above.

The device driver 2715 stores the driver program for driving the second printer PT2. The device status 2714 stores the status information of the second printer PT2. The record management 2713 then stores every kind of information, such as purchase date or trouble log information, concerning the second printer PT2.

The status information data parts 2720 and 2730 are constituted by the same structure as the status information data part 2710, therefore, the descriptions will be omitted.

By the data structure described above, peripherals can be easily added to or removed from the network.

With the process of adding a new peripheral to the network, when a device status corresponding to the IP address has been obtained, if the same device status is not connected to the device status management table (see FIG. 27) of the printer manager 105, the host computer newly links the above device status to the network in the shape of a chain by changing the above forward and backward pointers. On the other hand, if the same device status has been connected to the management table, only the device status is changed without any change in pointer.

In addition, when the device corresponding to the IP address has not been connected to the LAN, or not supplying the power to the device, the management table (see FIG. 27) of the printer manager 105 is retrieved due to no response, and if the device status corresponding to the IP address is found, the device status will be separated from the management table (see FIG. 27) of the printer manager 105 by changing the above-mentioned pointers.

System Control

When data created by an application of the host computer is displayed on the CRT, then the data is sent to the operating system 101 of the host computer. The operating system 101 is a printer font driver software optimized by the print manager based upon the font type used in the print file, in which the data is unwound into the CRT image, the raster operation is executed, and then the CRT image is displayed on the CRT.

When the data created by the application software of the host computer is output as a print, then the print file data is sent to the operating system 101. The operating system 101 determines whether the data can be executed from the printer optimized by the print manager based upon the font type used in the print file. If it can, the data is unwound into the print image and the raster operation is executed. Then, the print image is transferred through the network to the printer selected according to the selection standard mentioned above.

As an aside, the above print status can be displayed on the GUI 107 through the print manager 105.

Also, the present invention may be applied to both a system constituted of a plurality of devices and a system constituted of one device. The present invention can be then applied to a case where the network is achieved by supplying the system or the device with a program.

As described above, in the information system according to the above embodiments, where at least one information control apparatus and a plurality of peripherals are interconnected through a network, the device driver software of the information control apparatus side is built into the respective peripherals in advance for controlling the peripherals themselves, and the status information of the respective peripherals is built in on the information control apparatus side at predetermined timing, thereby driving the respective peripherals easily by execution from the information control apparatus.

The built-in timing is provided at the time of supplying the power, reset, starting prints with the application software, detection of an error by the printer manager of the printer, starting the application software, etc., so that the device driver and the status information can be embodied in the information control apparatus without any increase in traffic of the network or burden of the CPU.

For this reason, as long as the operating system and the printer manager software are provided, any structure can be used for the network information processing system of the above embodiments.

Also, one host computer can have a plurality of printer server functions; otherwise one printer can be operated under the control of a plurality of servers.

Furthermore, since the status or information unique to the device is built in at the same timing as that of the device driver software, the latest status or information can be obtained at any time. Accordingly, this makes it possible to prevent the data file from failing printing due to lack of supplies, e.g., print paper, in spite of having other usable functions.

Furthermore, an optimum device driver software is selected from among a plurality of device driver programs and built in on the information control apparatus side, thereby automatically retrieving the driver software. Also, according to the above embodiments, the device driver software of the respective devices can be built into the device control software of the information control apparatus in turn at timing according to outputs from the system reset detection means, so that the software can be retrieved in its early stages without starting the application software.

Since the reset event of the device like printer is also transmitted to the information control apparatus, the device driver software can be built into the information control apparatus again, and this makes it possible to cope automatically with a difficulty at once even if the device trouble is propagated to the information control apparatus.

Also, when the IP address is sent to each device, if there is no predetermined response, the status information concerning any device which has failed to respond is deleted immediately, thereby selecting the device properly at a high speed.

Furthermore, in the above embodiments, all kinds of data, such as physical setting location data, execution status, processing speed, print resolution, running cost, machine name, maker name and the like, are used for the parameters for selection of devices, and this makes it possible to select an optimum device minutely.

Third Embodiment

The third embodiment is to provide an information processing system which further uses the frequency of trouble as one of parameters for selecting peripherals, in which a peripheral showing the least frequency of trouble is selected as a top priority, whereby the printing or image data inputs are achieved securely.

The total system structure, each device structure, the data structure of the status information concerning the respective peripherals, etc. are the same as those of the first and second embodiments, and only additional processing parts will be described below.

In a certain peripheral, e.g., a printer or a digital copier, when trouble has occurred, or an obstacle like clogged paper has taken place, the frequency of such occurrences is stored in a writable nonvolatile memory, not shown, of each peripheral. The frequency of occurrences is then sent at the same timing as that at which the device status is sent to the host computer.

Figure 28:
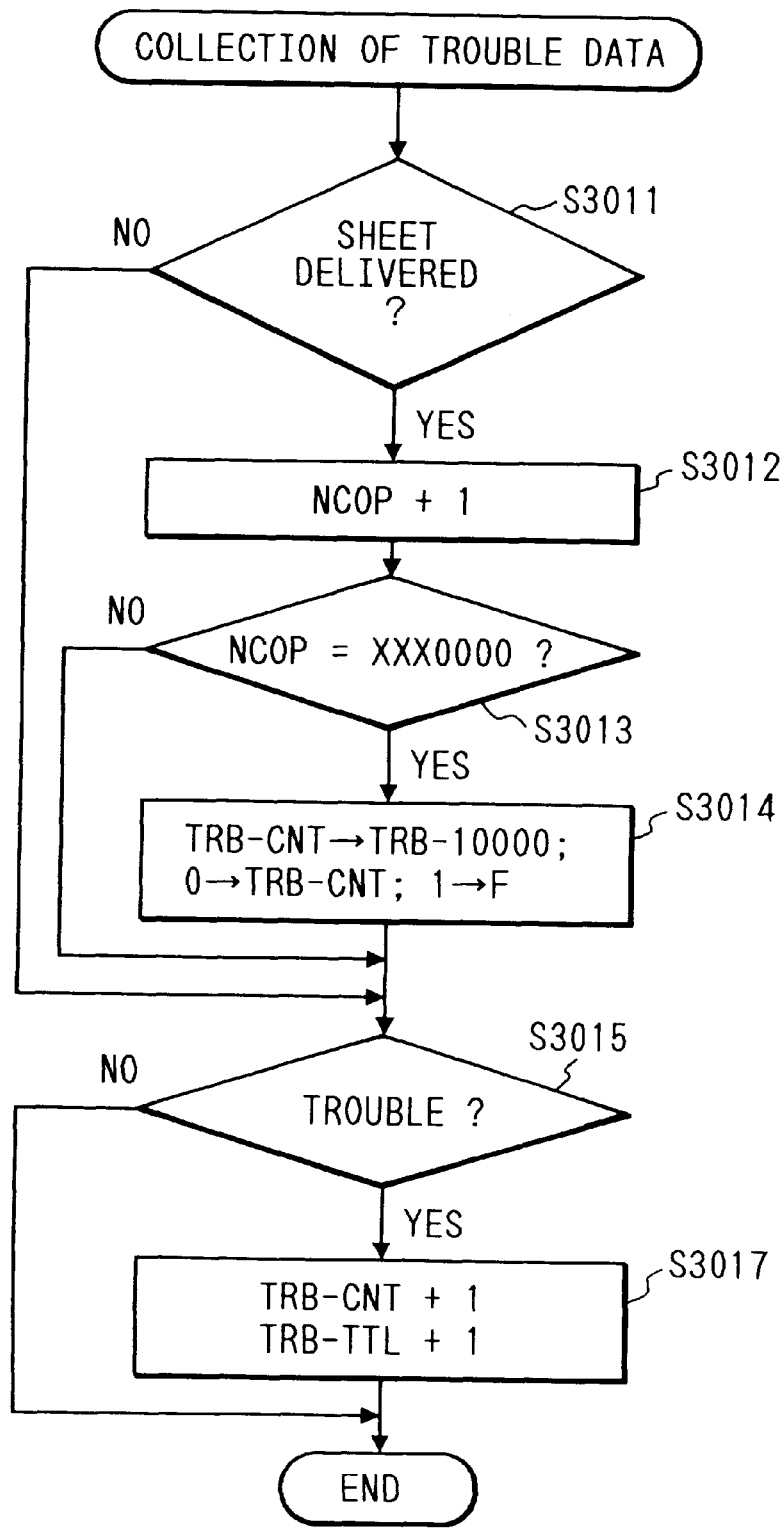
FIG. 28 is a flow chart showing a process of trouble data collection routine in the copier.

FIG. 28 shows the process of processing trouble data collection flow routine, for example, in the digital copier. This trouble data collection flow routine is periodically called in the interval of the main control processings of the digital copier. This routine measures how many troubles have occurred per thousand copies.

First of all, variable names used in the routine will be described before making an entry into the processing routine. These variables are initialized to zero before the entry into the trouble data collection flow routine.

1. "The total number of copies (NCOP)": a variable for storing count values while the number of copies comes to ten thousands.

2. "The measured frequency of trouble (TRB-CNT)": a variable for storing accumulated count values of trouble while the number of copies comes to ten thousands.

3. "The frequency of trouble (TRB-10000)": a variable showing the resulting value of the accumulated trouble at the time of the number of copies reaching ten thousands.

4. "F": a flag variable for informing the upper processing program that the number of copies has reached ten thousands.

5. "The total frequency of trouble (TRB-TTL)": the total frequency of trouble by this time.

Referring next to FIG. 28, processings at respective steps will be described.

At step S3011, it is checked whether a print sheet has been delivered from the copier, that is, whether one copy has been executed. If so, it goes to step S3012. Then, at step S3012, "the total number of copies" of the device status is incremented by one.

At step S3013, it is next checked whether "the total number of copies" is a multiple of ten thousand, that is, whether the lower four decimal digits are all zero. If zero, it goes to step S3014, the value of "the measured frequency of trouble" is stored as "the frequency of trouble", and "the measured frequency of trouble" is initialized for the next start of trouble accumulation, i.e., set to zero. On the other hand, if not zero, the flow goes to step S3015.

At step S3015, it is checked whether a trouble like clogged paper has occurred. If so, it goes to step S3016, "the measured frequency of trouble" is incremented by one, as does "the total frequency of trouble", counts and the flow returns to the upper processing program where the trouble data collection flow routine has called.

The upper processing program to which the processing has been returned from the trouble data collection flow routine checks whether "F" is 1 or not, and if it is 1, the trouble data is sent to the host computer, while "F" is initialized to zero.

Though the above process to count the frequency of trouble was executed by periodically calling the trouble data collection flow routine to check the frequency of trouble, it will be understood that the process may be executed by measuring the frequency of trouble per some predetermined number of copies as a unit by way of generating an interruption to the main controller 61 at the time of occurring one print sheet delivered and a trouble occurrence event, respectively call and execute the processing routine to accumulate the number of copies and the processing routine to accumulate the frequency of trouble.

Figure 29:
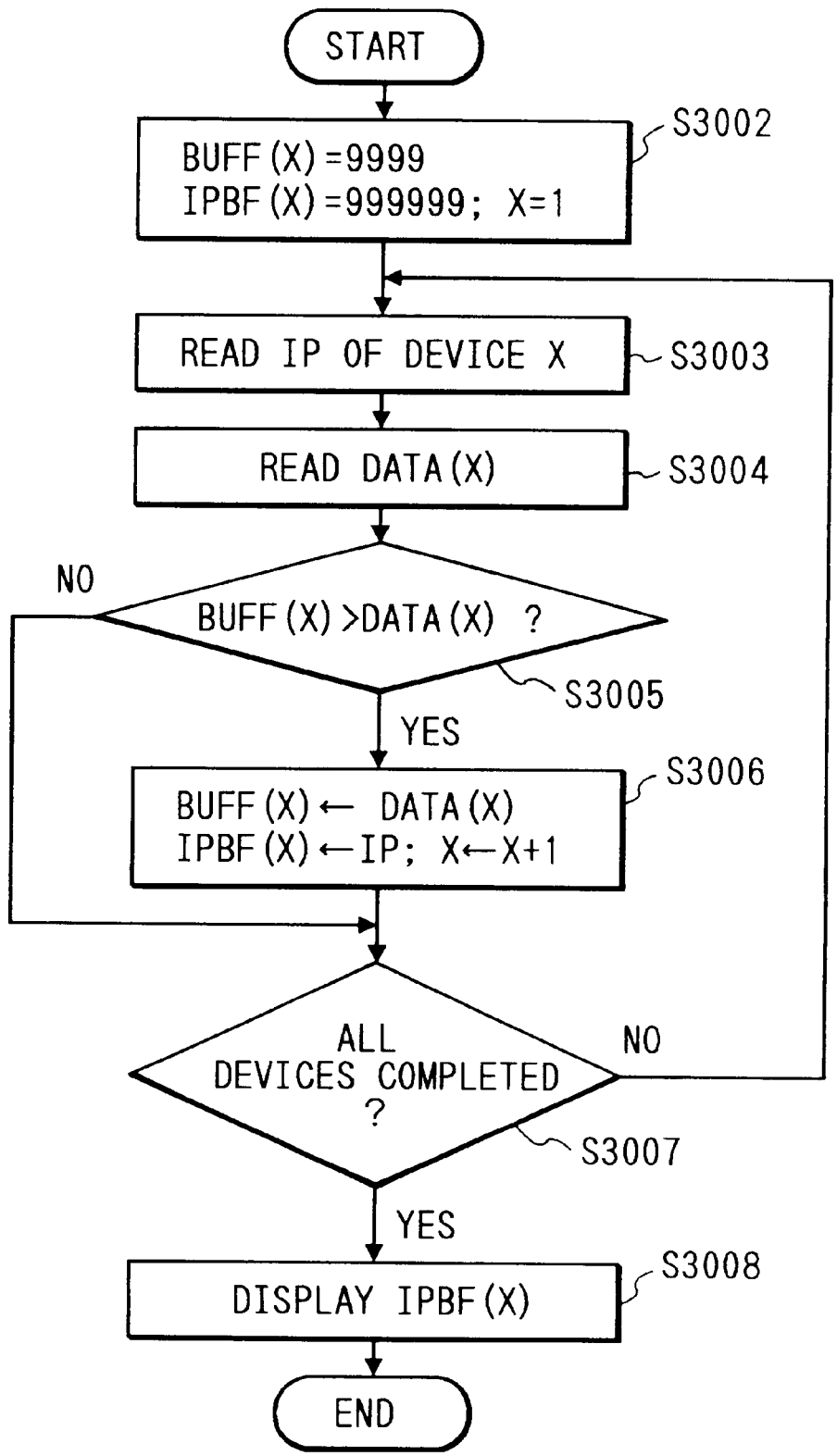
FIG. 29 is a flow chart showing a process of selection routine in the host computer for inputting the frequency of trouble in each device and selecting a device showing the least frequency of trouble.

Next, a process of selection routine for inputting the frequency of trouble by each device to select a device showing the least frequency of trouble will be described with reference to FIG. 29.

First of all, variable names will be described.

1. Data (X): a variable storing the frequency of trouble input from a device X.

2. BUFF (X): a variable which compares the device X with another device X−1 in the frequency of trouble to store the device showing the least frequency of trouble.

3. IPBF (X): a variable storing an IP number of the device X.

At step S3002, BUFF (X) is set to 9999 as dummy data concerning the frequency of trouble for an initial value, and IPBF (X) is set to 999999 as a dummy IP number of each device. Also, X is set to 1.

Then, at steps S3003 and S3004, the IP number of the digital copier and the data (X) concerning the frequency of trouble per ten thousand copies are read.

At step S3005, BUFF (X) is compared with the input data (X), and if the data (X) is less in the number of trouble than BUFF (X), the step goes to S3006 to store the data (X) and the device IP into BUFF (X) and IPBF (X), respectively. Also, X is incremented by one for the process of comparing the next trouble data.

At step S3007, it is next checked whether all copiers to be processed have been compared, and if not, the step returns to S3003. Finally, at step S3008, the device whose IP number remains in IPBF (X) is selected as the least device in frequency of trouble, and this result is displayed on the CRT. The host computer then requires the corresponding device to execute desired services based upon the above selection.

FIGS. 30 and 31 show a device status table of the copier case according to the third embodiment. Items added to the device status table of the copier shown in FIGS. 25 and 26 are "UPDATE DATE" 5000 for recording a date when the frequency of trouble has been updated, "TOTAL COPIES OF MADE (NCOP)" 5001 for recording the accumulated sum number of copies, "MEASURED FREQUENCY OF TROUBLE (TRB-CNT)" 5002 for recording the accumulated frequency of trouble concerning data being in measurement, "FREQUENCY OF TROUBLE (TRB-10000)" 5003 for recording the frequency of trouble per 10,000 copies, "TOTAL FREQUENCY OF TROUBLE (TRB-TTL)" 5004 for recording the total frequency of trouble by this time, and "CONSUMPTIVE POWER" 5005 showing the power being consumed at the time of execution.

In addition, the power being consumed is used as a parameter for selecting copiers, as well as the frequency of trouble.

FIGS. 32 and 33 show a device status table of the printer case according to the third embodiment. Items added to the device status table of the printer shown in FIGS. 23 and 24 are "UPDATE DATE" 6000 for recording a date when the frequency of trouble has been updated, "TOTAL NUMBER OF COPIES (NCOP)" 6001 for recording the accumulated sum number of copies, "MEASURED FREQUENCY OF TROUBLE (TRB-CNT)" 6002 for recording the accumulated frequency of trouble concerning data being in measurement, "FREQUENCY OF TROUBLE (TRB-10000)" 6003 for recording the frequency of trouble per 10,000 copies, "TOTAL FREQUENCY OF TROUBLE (TRB-TTL)" 6004 for recording the total frequency of trouble by this time, and "CONSUMPTIVE POWER" 6005 showing the power being consumed at the time of execution.

In addition, the power being consumed is used as a parameter for selecting printers, as well as the frequency of trouble.

As described above, according to this embodiment, the information processing system can select peripherals with keeping trouble to a minimum and provide services at the selected peripheral.

Also, since the status of each of devices connected to the network can be grasped by means of the structure of the present invention, resources on the network can be used effectively to maximize system performance to the limits of what the net work is capable of.

Furthermore, an optimum resource can be selected automatically without the user having to reach a judgment as to network system efficiency.

What is claimed is:

1. A peripheral processing apparatus connected to an information processing apparatus through a network, comprising:

storage means storing a control program which the information processing apparatus uses to control said peripheral processing apparatus;

reception means for receiving a transfer request from the information processing apparatus requesting that the control program stored in said storage means be transferred to the information processing apparatus through the network;

securing means for securing a channel to the information processing apparatus through the network on the basis of the transfer request received by said reception means; and transfer means for transferring the control program stored in said storage means through the channel secured by said securing means on the network to the information processing apparatus in response to the transfer request received by said reception means, so as to allow the information processing apparatus to use the control program to generate control data for controlling said peripheral processing apparatus, which control data is subsequently to be transferred to said peripheral processing apparatus through the network.

2. An apparatus according to claim 1, wherein the control program comprises a printer driver for the peripheral processing apparatus which is interpreted and executed by the information processing apparatus.

3. An apparatus according to claim 1, wherein said transfer means executes transfer at a timing based upon reset operation of the peripheral processing apparatus.

4. An apparatus according to claim 1, wherein said transfer means executes transfer at a timing based upon detection of a state in which the peripheral processing apparatus is unable to execute its processing.

5. A peripheral processing apparatus according to claim 1, wherein said reception means receives the control data from the information processing apparatus generated by the information processing apparatus using the transferred control program, and said peripheral processing apparatus further comprising control means for executing a control processing according to the control data received by said reception means.

6. A peripheral processing apparatus connected to an information processing apparatus through a network, comprising:

storage means storing a control program;

reception means for receiving a transfer request from the information processing apparatus requesting that the control program stored in said storage means be transferred to the information processing apparatus through the network;

transfer means for transferring the control program stored in said storage means through the network to the information processing apparatus in response to the transfer request received by said reception means, so as to allow the information processing apparatus to use the control program to generate control data for controlling said peripheral processing apparatus, which control data is subsequently to be transferred to said peripheral processing apparatus through the network;

unique information storage means for storing information unique to said peripheral processing apparatus; and control means for controlling said transfer means to transfer the unique information stored in said unique information storage means through the network to the information processing apparatus in response to said reception means receiving a transfer request from the information processing apparatus requesting that the unique information be transferred to the information processing apparatus.

7. An apparatus according to claim 6, wherein the control program comprises a printer driver for the peripheral processing apparatus which is interpreted and executed by the information processing apparatus.

8. An apparatus according to claim 6, wherein the peripheral processing apparatus is a printer for forming images.

9. An apparatus according to claim 6, wherein the peripheral processing apparatus is a copy machine.

10. An apparatus according to claim 6, wherein said transfer means executes transfer at a timing based upon reset operation of the peripheral processing apparatus.

11. An apparatus according to claim 6, wherein said transfer means executes transfer at a timing based upon detection of a state in which the peripheral processing apparatus is unable to execute its processing.

12. An apparatus according to claim 6, wherein the unique information describes each location of the peripheral processing apparatus.

13. An apparatus according to claim 6, wherein the unique information describes execution speed of the peripheral processing apparatus.

14. An apparatus according to claim 6, wherein the unique information describes running cost of each of the peripheral processing apparatuses.

15. An apparatus according to claim 6, wherein the unique information describes power consumption of each of the peripheral processing apparatuses.

16. An apparatus according to claim 6, wherein the unique information describes a trouble rate of each of the peripheral processing apparatuses.

17. An information processing apparatus connected to a peripheral processing apparatus through a network, comprising:

request means for requesting the peripheral processing apparatus to transfer a control program for controlling the peripheral processing apparatus to said information processing apparatus through the network;

reception means for receiving the control program transferred from the peripheral processing apparatus through the network in response to a request provided by said request means;

building means for placing the control program received by said reception means under the control of an operating system and building the received control program in the operating system; and generation and transfer means for generating control data for controlling the peripheral processing apparatus using the control program built in the operating system by said building means and transferring the control data through the network to the peripheral processing apparatus.

18. An apparatus according to claim 17, wherein the control program comprises a printer driver for the peripheral processing apparatus which is interpreted and executed by said information processing apparatus.

19. An apparatus according to claim 17, wherein said reception means receives the control program from the peripheral processing apparatus through the network at timing based upon reset operation of the peripheral processing apparatus.

20. An apparatus according to claim 17, wherein said reception means receives the control program from the peripheral processing apparatus through the network at timing based upon reset operation of the information processing apparatus.

21. An apparatus according to claim 17, wherein said reception means receives the control program from the peripheral processing apparatus through the network at a timing based upon detection of a state in which the peripheral processing apparatus is unable to execute its processing.

22. An information processing apparatus connected to a peripheral processing apparatus through a network, comprising:

request means for requesting the peripheral processing apparatus to transfer a control program for controlling the peripheral processing apparatus to said information processing apparatus through the network;

reception means for receiving the control program transferred from the peripheral processing apparatus through the network in response to a request provided by said request means;

storage means for storing the control program received by said reception means; and generation and transfer means for generating control data for controlling the peripheral processing apparatus using the control program stored in said storage means and transferring the control data through the network to the peripheral processing apparatus;

wherein said apparatus is connected to a plurality of the peripheral processing apparatuses through the network, wherein said request means requests each of the plurality of peripheral processing apparatuses to transfer information unique to the peripheral processing apparatus to said information processing apparatus through the network, and wherein said reception means receives the unique information transferred from each of the plurality of peripheral processing apparatuses through the network in response to a request provided by said request means, and said information processing apparatus further comprising:

second storage means for storing the unique information received by said reception means; and selection means for selecting one of the plurality of peripheral apparatuses based on the unique information stored in said second storage means, wherein said generation and transfer means generates control data for controlling the one peripheral processing apparatus selected by said selection means based on the control program stored in said storage means and transfers the control data through the network to the selected one peripheral processing apparatus.

23. An apparatus according to claim 22, wherein the control program comprises a printer driver for the peripheral processing apparatus which is interpreted and executed by said information processing apparatus.

24. An apparatus according to claim 22, wherein one said peripheral processing apparatus is a printer for forming images.

25. An apparatus according to claim 22, wherein one said peripheral processing apparatus is a copy machine.

26. An apparatus according to claim 22, wherein each said peripheral processing apparatus is a copy machine.

27. An apparatus according to claim 22, wherein said reception means receives both the control program and the unique information from the peripheral processing apparatuses through the network at timing based upon reset operation of the peripheral processing apparatuses.

28. An apparatus according to claim 22, wherein said reception means receives the unique information from the peripheral processing apparatuses through the network at a timing based upon detection of a state in which any of the peripheral processing apparatuses is unable to execute its processing.

29. An apparatus according to claim 22, wherein, when said reception means receives the unique information from the peripheral processing apparatuses through the network at a timing based upon detection of a state in which any of the peripheral processing apparatuses is unable to execute its processing, said selection means eliminates whichever of the peripheral processing apparatuses is in the inexecutable state, from possible apparatuses available to be selected.

30. An apparatus according to claim 22, wherein the unique information describes execution speed of each of the peripheral processing apparatuses.

31. An apparatus according to claim 22, wherein the unique information describes each location of the peripheral processing apparatuses.

32. An apparatus according to claim 22, wherein the unique information describes running cost of each of the peripheral processing apparatuses.

33. An apparatus according to claim 22, wherein the unique information describes power consumption of each of the peripheral processing apparatuses.

34. An apparatus according to claim 22, wherein the unique information describes a trouble rate of each of the peripheral processing apparatuses.

35. A method of controlling a peripheral processing apparatus connected to an information processing apparatus through a network, comprising the steps of:
storing a control program in a memory, which the information processing apparatus uses to control said peripheral processing apparatus;
receiving a transfer request from the information processing apparatus requesting that the control program stored in said storage means be transferred to the information processing apparatus through the network;
securing a channel to the information processing apparatus through the network on the basis of the transfer request received by said reception means; and
transferring the control program stored in the memory through the channel secured by said securing step on the network to the information processing apparatus in response to a transfer request received in said receiving step, so as to allow the information processing apparatus to use the control program to generate control data for controlling the peripheral processing apparatus, which control data is subsequently to be transferred to the peripheral processing apparatus through the network.

36. A method according to claim 35, wherein the control program comprises a printer driver for the peripheral processing apparatus which is interpreted and executed by the information processing apparatus.

37. A method according to claim 35, wherein the peripheral processing apparatus is a printer for forming images.

38. A method according to claim 35, wherein the peripheral processing apparatus is a copy machine.

39. A method according to claim 35, wherein said transfer step is executed at a timing based upon reset operation of the peripheral processing apparatus.

40. A method according to claim 35, wherein said transfer step is executed at a timing based upon detection of a state in which the peripheral processing apparatus is unable to execute its processing.

41. A method according to claim 35, wherein said receiving step includes receiving the control data from the information processing apparatus generated by the information processing apparatus using the transferred control program, and said method further comprising the step of executing a control processing according to the control data received in said receiving step.

42. A method of controlling a peripheral processing apparatus connected to an information processing apparatus through a network, comprising the steps of:
storing a control program in a memory;
receiving a transfer request from the information processing apparatus requesting that the control program stored in said storage means be transferred to the information processing apparatus through the network;
transferring the control program stored in the memory through the network to the information processing apparatus in response to a transfer request received in said receiving step, so as to allow the information processing apparatus to use the control program to generate control data for controlling the peripheral processing apparatus, which control data is subsequently to be transferred to the peripheral processing apparatus through the network;
storing information unique to the peripheral processing apparatus; and
controlling to execute said transferring step, to transfer the stored unique information through the network to the information processing apparatus in response to receipt in said receiving step of a transfer request from the information processing apparatus requesting that the unique information be transferred to the information processing apparatus.

43. A method according to claim 42, wherein the control program comprises a printer driver for the peripheral processing apparatus which is interpreted and executed by the information processing apparatus.

44. A method according to claim 42, wherein the peripheral processing apparatus is a printer for forming images.

45. A method according to claim 42, wherein the peripheral processing apparatus is a copy machine.

46. A method according to claim 42, wherein said transfer step is executed at a timing based upon reset operation of the peripheral processing apparatus.

47. A method according to claim 42, wherein said transfer step is executed at a timing based upon detection of a state in which the peripheral processing apparatus is unable to execute its processing.

48. A method according to claim 42, wherein the unique information describes location of the peripheral processing apparatus.

49. A method according to claim 42, wherein the unique information describes execution speed of the peripheral processing apparatus.

50. A method according to claim 42, wherein the unique information describes running cost of the peripheral processing apparatus.

51. A method according to claim 42, wherein the unique information describes power consumption of the peripheral processing apparatus.

52. A method according to claim 42, wherein the unique information describes a trouble rate of the peripheral processing apparatus.

53. A control method for use in a peripheral processing apparatus connected to an information processing apparatus through a network, comprising the steps of:

requesting the peripheral processing apparatus to transfer a control program for controlling the peripheral processing apparatus to the information processing apparatus through the network;

receiving the control program transferred from the peripheral processing apparatus through the network for controlling the peripheral processing apparatus in response to a request provided in said requesting step;

placing the received control program under the control of an operating system and building the received control program in the operating system; and generating control data for controlling the peripheral processing apparatus using the control program built in the operating system and transferring the control data through the network to the peripheral processing apparatus.

54. A method according to claim 53, wherein the control program comprises a printer driver for the peripheral processing apparatus which is interpreted and executed by the information processing apparatus.

55. A method according to claim 53, wherein the peripheral processing apparatus is a printer for forming images.

56. A method according to claim 53, wherein the peripheral processing apparatus is a copy machine.

57. A method according to claim 53, wherein said receiving step includes receiving the control program from the peripheral processing apparatus through the network at a timing based upon reset operation of the peripheral processing apparatus.

58. A method according to claim 53, wherein said receiving step includes receiving the control program from the peripheral processing apparatus through the network at a timing based upon detection of a state in which the peripheral processing apparatus is unable to execute its processing.

59. A control method for use in a peripheral processing apparatus connected to an information processing apparatus through a network, comprising the steps of:

requesting the peripheral processing apparatus to transfer a control program for controlling the peripheral processing apparatus to the information processing apparatus through the network:

receiving the control program transferred from the peripheral processing apparatus through the network for controlling the peripheral processing apparatus in response to a request provided in said requesting step;

storing the received control program in a memory;

generating control data for controlling the peripheral processing apparatus using the control program stored in said storing process and transferring the control data through the network to the peripheral processing apparatus;

requesting each of the plurality of peripheral processing apparatuses to transfer information unique to the peripheral processing apparatus to the information processing apparatus through the network, in response to a request provided in said requesting step;

storing the received unique information in a memory; and selecting one of the peripheral apparatuses based on the unique information stored in the memory, wherein said step of generating control data includes generating control data for controlling the one peripheral processing apparatus selected in said selecting step based on the stored control program and transferring the control data through the network to the selected one peripheral apparatus.

60. A method according to claim 59, wherein the control program comprises a printer driver for the peripheral processing apparatus which is interpreted and executed by the information processing apparatus.

61. A method according to claim 59, wherein the peripheral processing apparatus is a printer for forming images.

62. A method according to claim 59, wherein the peripheral processing apparatus is a copy machine.

63. A method according to claim 59, wherein said receiving step includes receiving both the control program and the unique information from the peripheral processing apparatuses through the network at a timing based upon reset operation of the peripheral processing apparatuses.

64. A method according to claim 59, wherein said receiving step includes receiving the unique information from the peripheral processing apparatuses through the network at a timing based upon detection of a state in which any of the peripheral processing apparatuses is unable to execute its processing.

65. A method according to claim 59, wherein, when said receiving step receives the unique information from the peripheral processing apparatuses through the network at a timing based upon detection of a state in which any of the peripheral processing apparatuses is unable to execute its processing, said selection process eliminates whichever of the peripheral processing apparatuses is in the inexecutable state, from possible apparatuses available to be selected.

66. A method according to claim 59, wherein the unique information describes location of each of the peripheral processing apparatuses.

67. A method according to claim 59, wherein the unique information describes execution speed of each of the peripheral processing apparatuses.

68. A method according to claim 59, wherein the unique information describes running cost of each of the peripheral processing apparatuses.

69. A method according to claim 59, wherein the unique information describes power consumption of each of the peripheral processing apparatuses.

70. A method according to claim 59, wherein the unique information describes a trouble rate of each of the peripheral processing apparatuses.

71. An information processing apparatus connected to a plurality of peripheral processing apparatuses through a network, comprising:

reception means for receiving, from each of the plurality of peripheral processing apparatuses, information unique to the peripheral processing apparatus through the network;

selection means for selecting one of the plurality of peripheral processing apparatuses which is to print data, on the basis of the unique information received by said reception means;

memory means for storing a plurality of device drivers for controlling respective devices; and generation means for generating the data to be printed by the one peripheral processing apparatus selected by said selection means using one of the plurality of device drivers stored in said memory means corresponding to the selected peripheral processing apparatus.

72. An information processing apparatus according to claim 71, further comprising guide means for designating priorities between the unique information of the plurality of peripheral processing apparatuses, wherein said selection means selects one of the plurality of peripheral processing apparatuses on the basis of the priorities designated by said guide means.

73. An information processing apparatus according to claim 72, wherein the unique information indicates locations of the plurality of peripheral processing apparatuses.

74. An information processing apparatus according to claim 72, wherein the unique information indicates execution speeds of the plurality of peripheral processing apparatuses.

75. An information processing apparatus according to claim 72, wherein the unique information indicates running costs of the plurality of peripheral processing apparatuses.

76. An information processing apparatus according to claim 72, wherein the unique information indicates consumption powers of the plurality of peripheral processing apparatuses.

77. An information processing apparatus according to claim 72, wherein the unique information indicates trouble rates of the plurality of peripheral processing apparatuses.

78. An information processing apparatus according to claim 71, wherein said reception means further receives from the plurality of peripheral processing apparatuses respective device drivers.

79. An method of information processing, for processing information through a network comprising the steps of:

receiving, from each of a plurality of peripheral processing apparatuses, information unique to the peripheral processing apparatus through the network;

selecting one of the plurality of peripheral processing apparatuses which is to print data, on the basis of the unique information received by the receiving step;

storing a plurality of device drivers for controlling respective devices; and generating the data to be printed by the one peripheral processing apparatus selected by the selection step using one of the plurality of device drivers stored in the storing step corresponding to the selected peripheral processing apparatus.

80. An information processing method according to claim 79, further comprising designating priorities between the unique information of the plurality of peripheral processing apparatuses, wherein said selection step selects one of the plurality of peripheral processing apparatuses on the basis of the priorities designated by said designation.

81. An information processing method according to claim 80, wherein the unique information indicates locations of the plurality of peripheral processing apparatuses.

82. An information processing method according to claim 80, wherein the unique information indicates execution speeds of the plurality of peripheral processing apparatuses.

83. An information processing method according to claim 80, wherein the unique information indicates running costs of the plurality of peripheral processing apparatuses.

84. An information processing method according to claim 80, wherein the unique information indicates consumption powers of the plurality of peripheral processing apparatuses.

85. An information processing method according to claim 80, wherein the unique information indicates trouble rates of the plurality of peripheral processing apparatuses.

86. An information processing method according to claim 80, wherein said reception step further receives from the plurality of peripheral processing apparatuses respective device drivers.

* * * * *

UNITED STATES PATENT AND TRADEMARK OFFICE
CERTIFICATE OF CORRECTION

PATENT NO.   : 6,029,238
DATED        : February 22, 2000
INVENTOR(S)  : HIDEAKI FURUKAWA It is certified that error appears in the above-identified patent and that said Letters Patent is hereby corrected as shown below:

COLUMN 1:

Line 18, "soft-ware" should read --software--.

COLUMN 7:

Line 18, "paper" should read --paper,--; and
    Line 47, "softwares." should read --software.--.

COLUMN 8:

Line 3, "softwares." should read --software.--;
    Line 8, "softwares" should read --software--;
    Line 9, "softwares" should read --software--;
    Line 12, "softwares" should read --software--; and
    Line 44, "softwares." should read --software.--.

COLUMN 10:

Line 61, "effect" should read --effect integrating--.

COLUMN 11:

Line 4, "the all" should read --all--;
    Line 14, "detail" should read --details--;
    Line 39, "name," should read --names,--; and
    Line 67, "program" should read --software--.

UNITED STATES PATENT AND TRADEMARK OFFICE
CERTIFICATE OF CORRECTION

PATENT NO. : 6,029,238
DATED : February 22, 2000
INVENTOR(S) : HIDEAKI FURUKAWA

It is certified that error appears in the above-identified patent and that said Letters Patent is hereby corrected as shown below:

COLUMN 12:

Line 1, "software" should read --program--; and
    Line 35, "After" should read --At the--.

COLUMN 13:

Line 34, "is" should read --are--.

COLUMN 17:

Line 24, "informations" should read --information--.

COLUMN 20:

Line 45, "zero" should read --zeroes--.

COLUMN 21:

Line 28, "trouble" should read --troubles--.

COLUMN 22:

Line 18, "net work" should read --network--.

UNITED STATES PATENT AND TRADEMARK OFFICE
CERTIFICATE OF CORRECTION

PATENT NO.    : 6,029,238
DATED         : February 22, 2000
INVENTOR(S)   : HIDEAKI FURUKAWA It is certified that error appears in the above-identified patent and that said Letters Patent is hereby corrected as shown below:

<u>COLUMN 27</u>:

Line 63, "network:" should read --network;--.

Signed and Sealed this

Fifteenth Day of May, 2001

Attest:

NICHOLAS P. GODICI

*Attesting Officer*    *Acting Director of the United States Patent and Trademark Office*